US012743089B2

(12) United States Patent
Tokuda et al.

(10) Patent No.: US 12,743,089 B2
(45) Date of Patent: Sep. 22, 2026

(54) OPERATION SETTING DEVICE OF AUTONOMOUS BOGIE, NON-TRANSITORY COMPUTER READABLE MEDIUM STORING OPERATION SETTING PROGRAM, AND OPERATION SETTING METHOD

(71) Applicant: Keigan Inc., Kyoto (JP)

(72) Inventors: Takashi Tokuda, Kyoto (JP); Naoaki Kurimoto, Kyoto (JP); Hiroyuki Oku, Kyoto (JP)

(73) Assignee: Keigan Inc., Kyoto (JP)

( * ) Notice: Subject to any disclaimer, the term of this patent is extended or adjusted under 35 U.S.C. 154(b) by 4 days.

(21) Appl. No.: 18/410,306

(22) Filed: Jan. 11, 2024

(65) Prior Publication Data

US 2024/0176361 A1 May 30, 2024

Related U.S. Application Data

(63) Continuation of application No. PCT/JP2022/027724, filed on Jul. 14, 2022.

(30) Foreign Application Priority Data

Jul. 15, 2021 (JP) ................................ 2021-117245

(51) Int. Cl.
*G05D 1/224* (2024.01)
*B61B 13/00* (2006.01)
(Continued)

(52) U.S. Cl.
CPC ........... *G05D 1/2246* (2024.01); *B61B 13/00* (2013.01); *G01S 17/931* (2020.01); *G05D 1/246* (2024.01)

(58) Field of Classification Search
CPC ...... G05D 1/2246; G05D 1/246; G05D 1/228; G05D 2105/28; G05D 2107/70;
(Continued)

(56) References Cited

U.S. PATENT DOCUMENTS

2011/0166703 A1* 7/2011 Byrne .................... B25J 9/1682 901/50
2012/0158235 A1 6/2012 Jaynes
(Continued)

FOREIGN PATENT DOCUMENTS

JP S63-156203 A 6/1988
JP 2005-339408 A 12/2005
(Continued)

OTHER PUBLICATIONS

Partial supplementary Search Report mailed on Sep. 26, 2024 for corresponding European Application No. 22842181.4.
(Continued)

*Primary Examiner* — Nga X Nguyen
(74) *Attorney, Agent, or Firm* — Michael Best & Friedrich LLP

(57) ABSTRACT

An operation setting device of an autonomous bogie includes a receiving unit that receives designation of a specific location within a traveling area of an autonomous bogie from a user, and receives designation of an operation of the autonomous bogie at the designated specific location from the user.

8 Claims, 26 Drawing Sheets

(51) Int. Cl.
*G01S 17/931* (2020.01)
*G05D 1/246* (2024.01)

(58) Field of Classification Search
CPC .. G05D 2109/10; G05D 1/2297; G05D 1/628; B61B 13/00; G01S 17/931; B25J 5/007; B66F 9/063
See application file for complete search history.

(56) References Cited

U.S. PATENT DOCUMENTS

| | | | | |
|---|---|---|---|---|
| 2019/0094869 | A1* | 3/2019 | Artes | G05D 1/0044 |
| 2019/0278269 | A1 | 9/2019 | He et al. | |
| 2021/0018912 | A1 | 1/2021 | Dymesich et al. | |
| 2021/0162961 | A1 | 6/2021 | Yamaguchi et al. | |
| 2021/0173403 | A1* | 6/2021 | Teramoto | G06N 3/08 |
| 2021/0316975 | A1* | 10/2021 | Yeo | G01S 17/42 |
| 2021/0349471 | A1* | 11/2021 | Ross | B60W 60/00256 |

FOREIGN PATENT DOCUMENTS

| | | | |
|---|---|---|---|
| JP | 2012-160059 | A | 8/2012 |
| JP | 2014-186693 | A | 10/2014 |
| JP | 2018-112917 | A | 7/2018 |
| JP | 2021-084177 | A | 6/2021 |
| JP | 2021-089629 | A | 6/2021 |
| WO | 2017/030188 | A1 | 2/2017 |

OTHER PUBLICATIONS

International Search Report mailed on Sep. 6, 2022, for the corresponding PCT Application No. PCT/JP2022/027724, with English machine translation.

Japanese Office Action mailed on Jun. 23, 2026 for the corresponding Japanese Patent Application No. 2023-534860, with English machine translation.

German Office Action dated Jul. 23, 2026 for the corresponding German Application No. 22 842 181.4.

* cited by examiner

FIG. 14
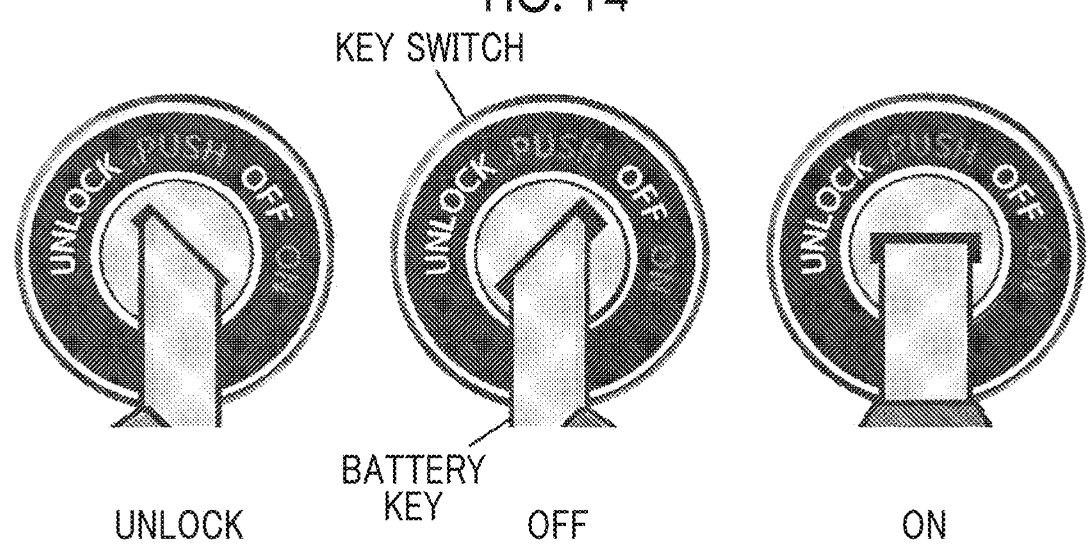
FIG. 15
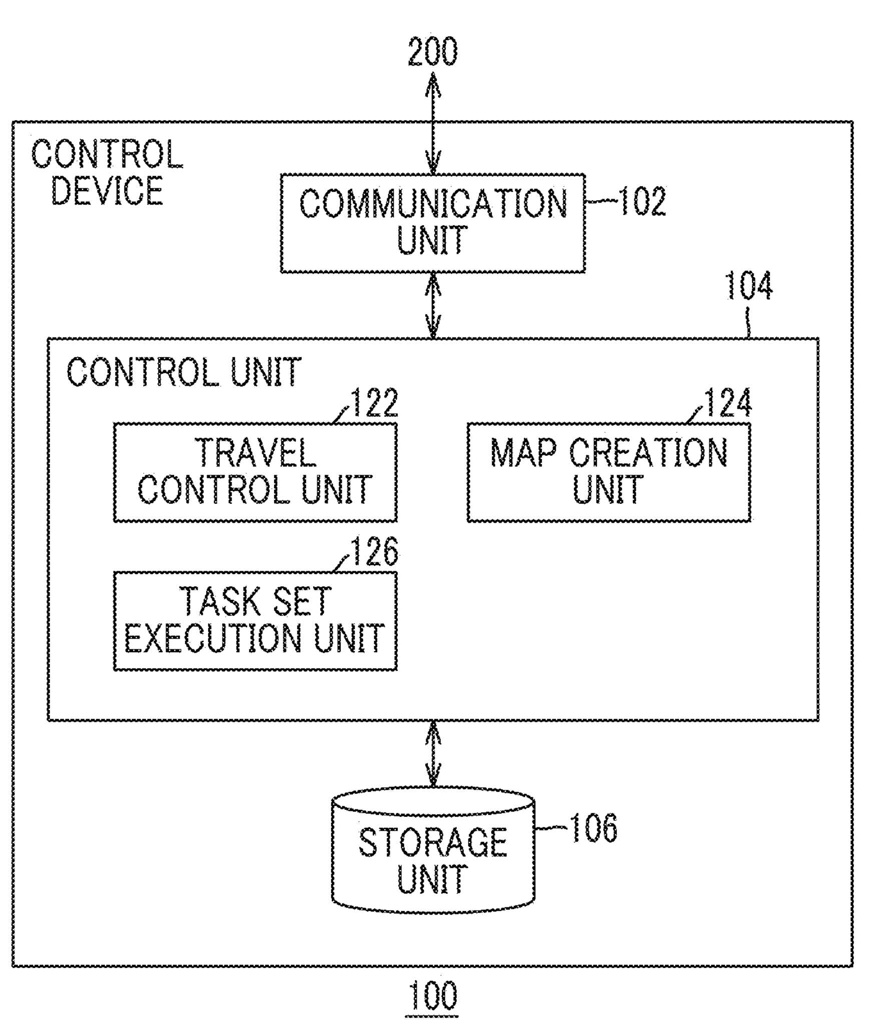

FIG. 19
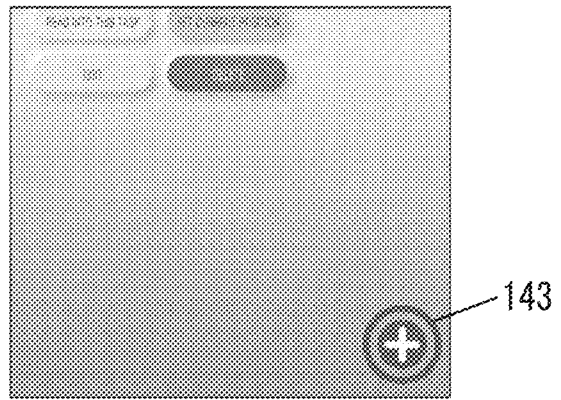
1. MAP → SELECT ⊕ ICON AT LOWER RIGHT OF MAP LIST
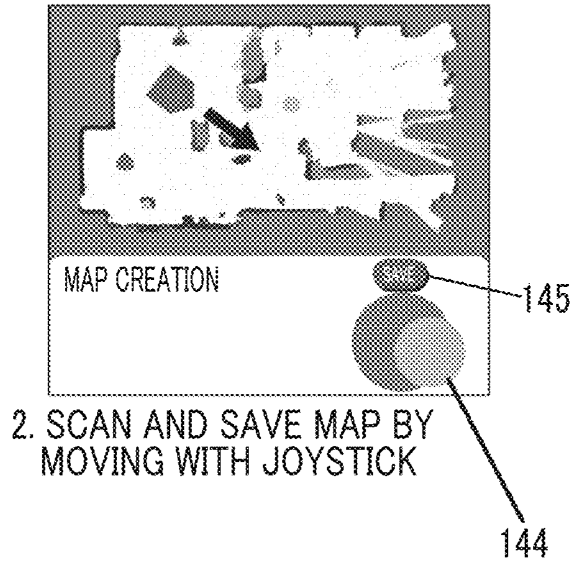
2. SCAN AND SAVE MAP BY MOVING WITH JOYSTICK
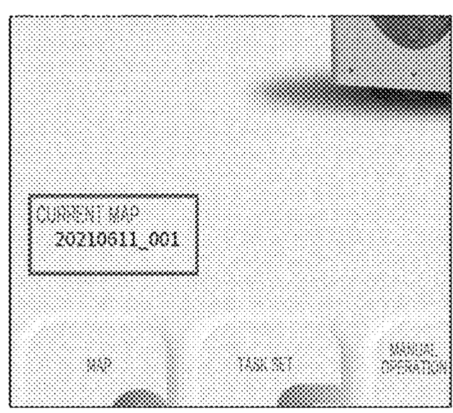
3. SAVED MAP IS AUTOMATICALLY READ AND SET AS "CURRENT MAP"

FIG. 20A

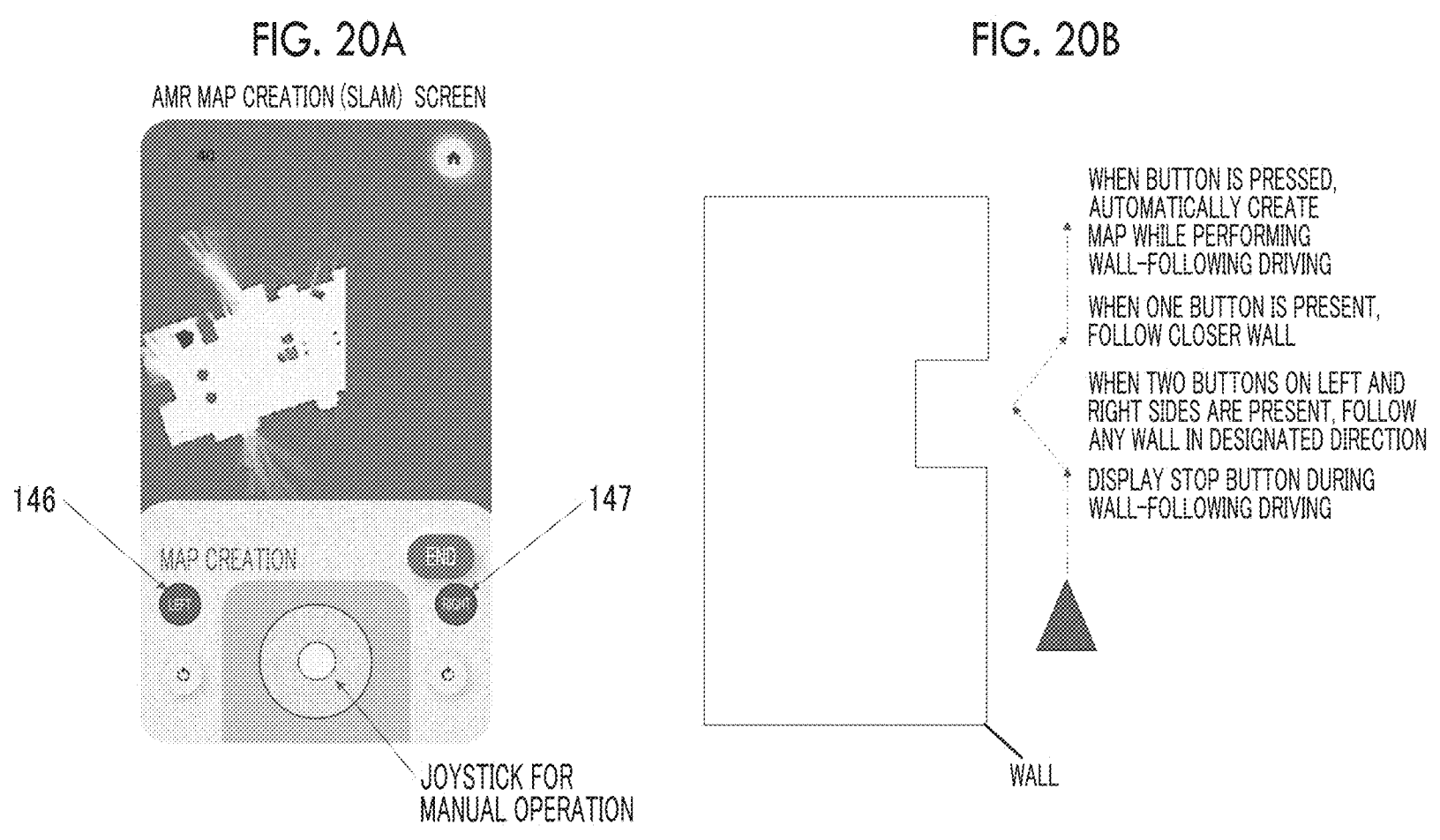

AMR MAP CREATION (SLAM) SCREEN

MAP CREATION

END

146

147

JOYSTICK FOR MANUAL OPERATION

FIG. 20B

WHEN BUTTON IS PRESSED, AUTOMATICALLY CREATE MAP WHILE PERFORMING WALL-FOLLOWING DRIVING

WHEN ONE BUTTON IS PRESENT, FOLLOW CLOSER WALL

WHEN TWO BUTTONS ON LEFT AND RIGHT SIDES ARE PRESENT, FOLLOW ANY WALL IN DESIGNATED DIRECTION

DISPLAY STOP BUTTON DURING WALL-FOLLOWING DRIVING

WALL

FIG. 21
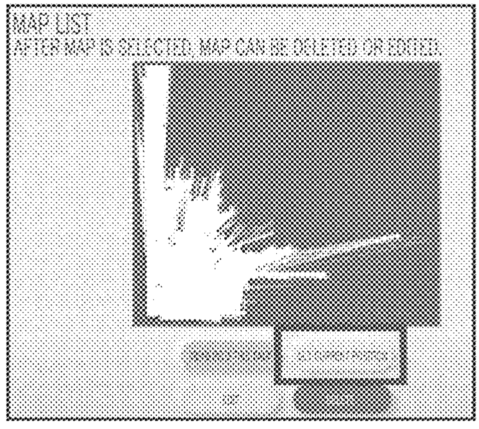
1. IN STATE WHERE MAP IS READ, SELECT "CURRENT POSITION SETTING"
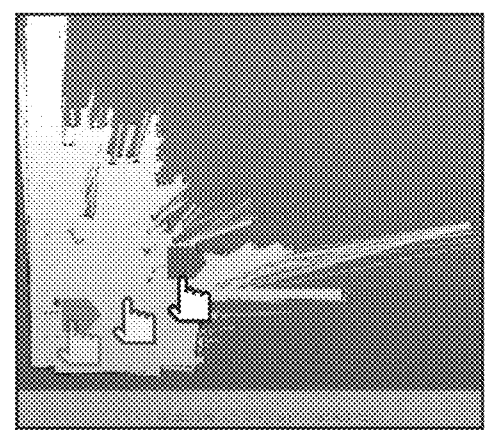
2. MOVE TO CURRENT LOCATION WHILE COMPARING MAP WITH SCENERY, WHILE DRAGGING ▶
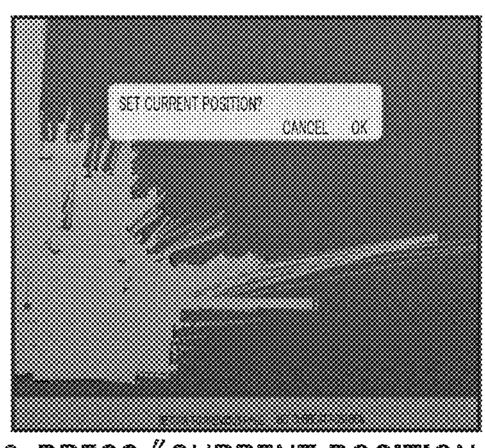
3. PRESS "CURRENT POSITION SETTING" BUTTON AT LOWER PART OF SCREEN, AND SELECT OK TO COMPLETE FIG. 22
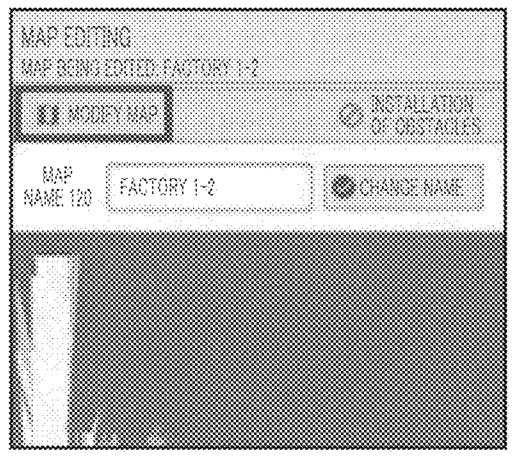
1. SELECT MAP TO BE MODIFIED AND SELECT MODIFY MAP
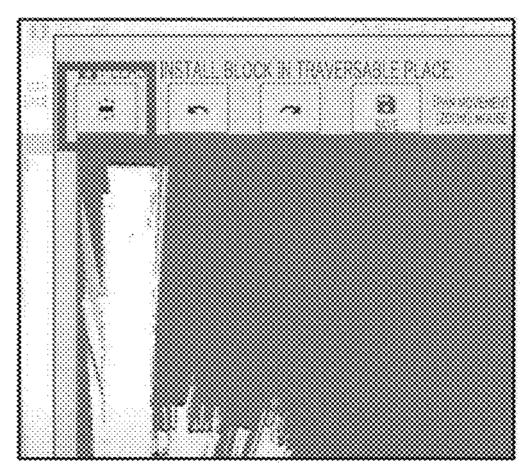
2. PRESS BUTTON TO DESIGNATE DELETION RANGE (PLURAL IS POSSIBLE) AND SAVE WITH
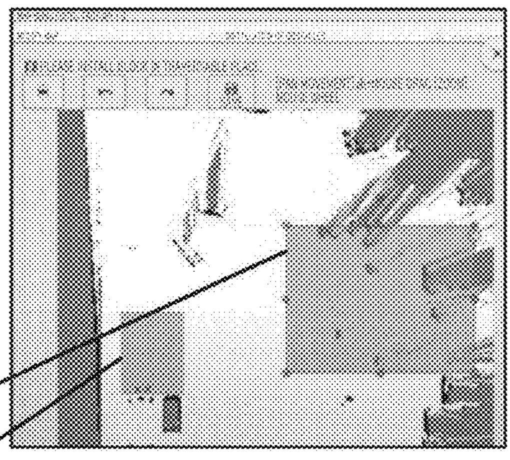
3. WHEN THERE IS NO OBSTACLE ACTUALLY IN DESIGNATED LOCATION, TRAVEL AS TRAVELABLE AREA FIG. 23
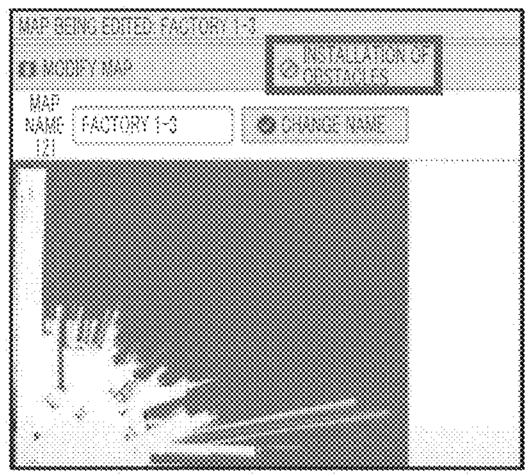
1. SELECT MAP TO BE MODIFIED AND SELECT ⊘ INSTALLATION OF OBSTACLES
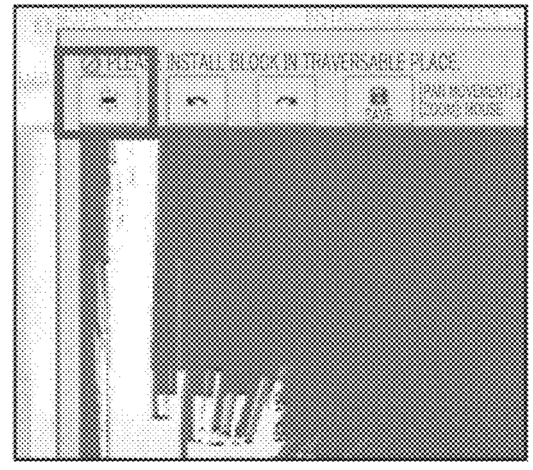
2. PRESS BUTTON TO DESIGNATE DELETION RANGE (PLURAL IS POSSIBLE) AND SAVE WITH
3. EVEN WHEN THERE IS NO OBSTACLE ACTUALLY IN DESIGNATED LOCATION, TRAVEL AS TRAVELABLE AREA FIG. 24
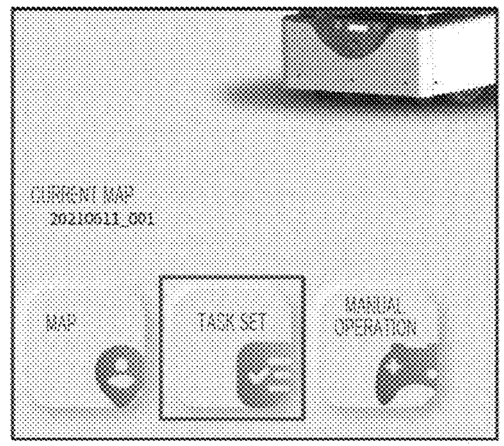
1. SELECT "TASK SET" FROM APPLICATION TOP SCREEN
2. SELECT ⊕ ICON TO CREATE NEW TASK SET
* REFER TO NEXT PAGE TO EDIT CREATED TASK SET
149
3. SELECT "MANUAL OPERATION" TO MOVE TO POINT TO BE INSTALLED BY MOVING WITH JOYSTICK FIG. 25
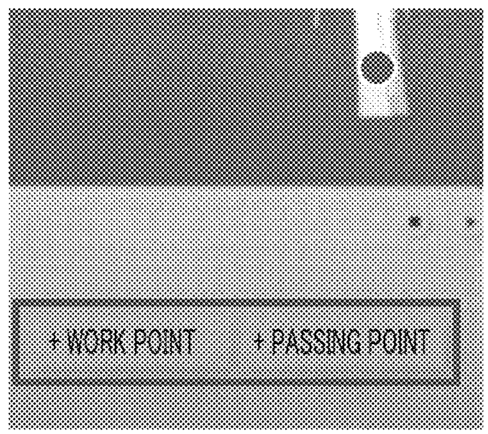
4. SELECT FOLLOWINGS AT LOCATION TO BE INSTALLED
WORK POINT: POINT TO STOP
PASSING POINT: POINT TO PASS THROUGH
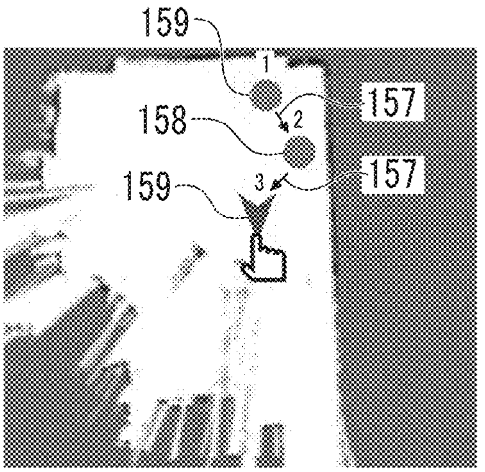
5. WHEN INSTALLED POINT IS SELECTED, COLOR CHANGES TO RED, AND MOVING OR SETTING IS POSSIBLE
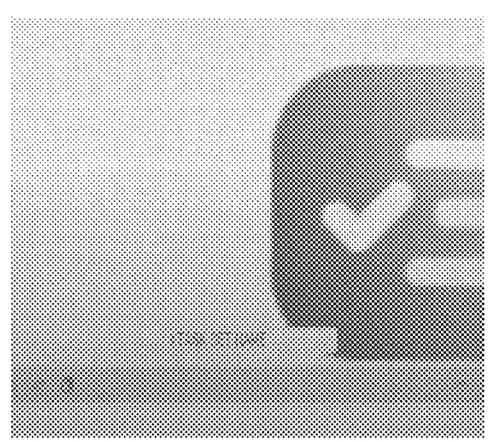
6. AFTER SETTING IS COMPLETED, SELECT SAVE, AND TASK SET IS SAVED WITH NAME
FIG. 26
| | |
|---|---|
| OPERATE SELECTED TASK | EDIT NAME OF TASK SET AND MAP |
| STOP OPERATING TASK SET | DELETE TASK SET |

FIG. 27C
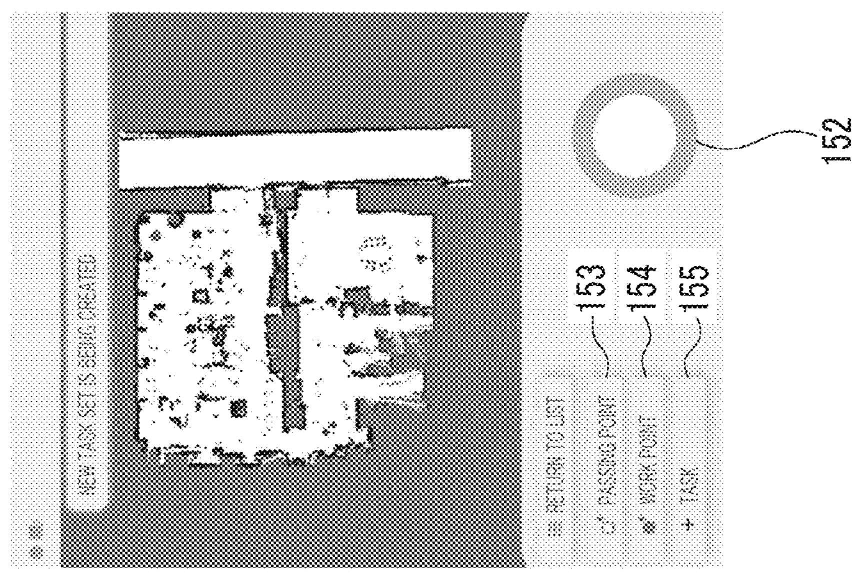
FIG. 27B
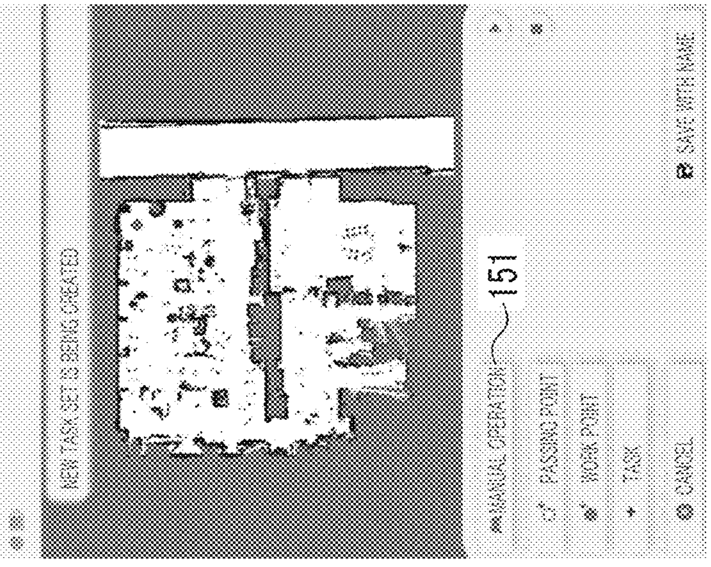
FIG. 27A
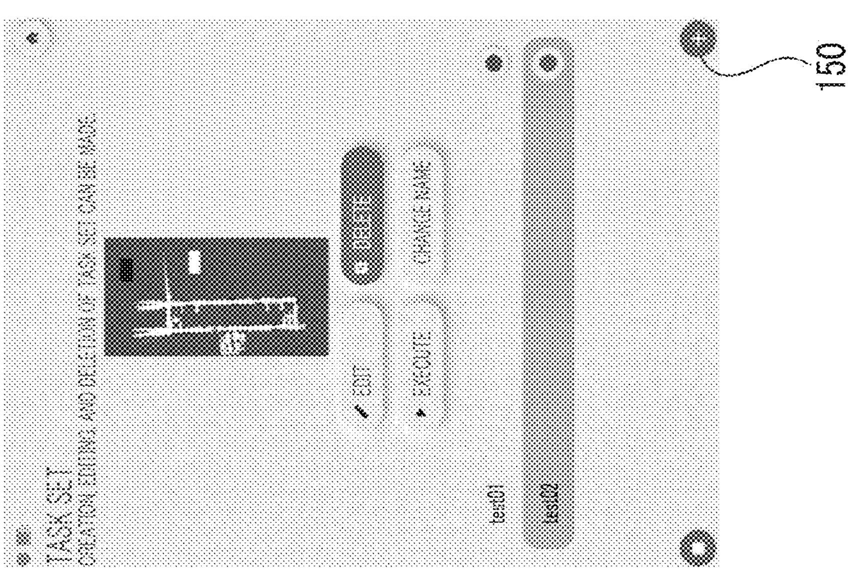

FIG. 28A
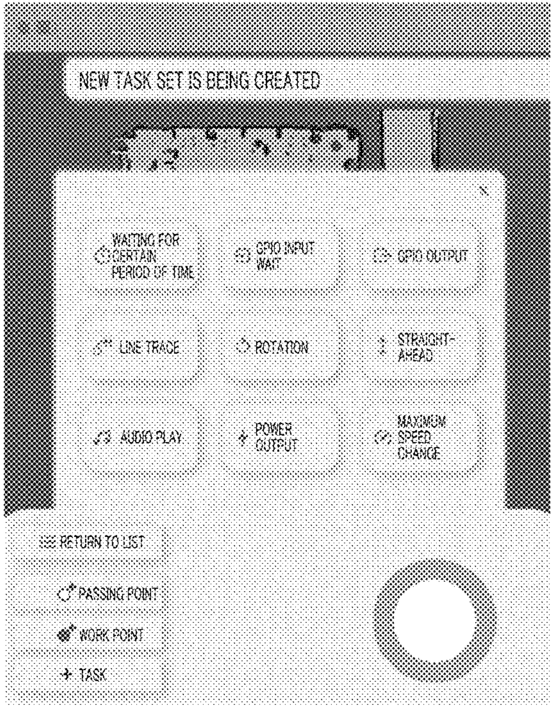
FIG. 28B
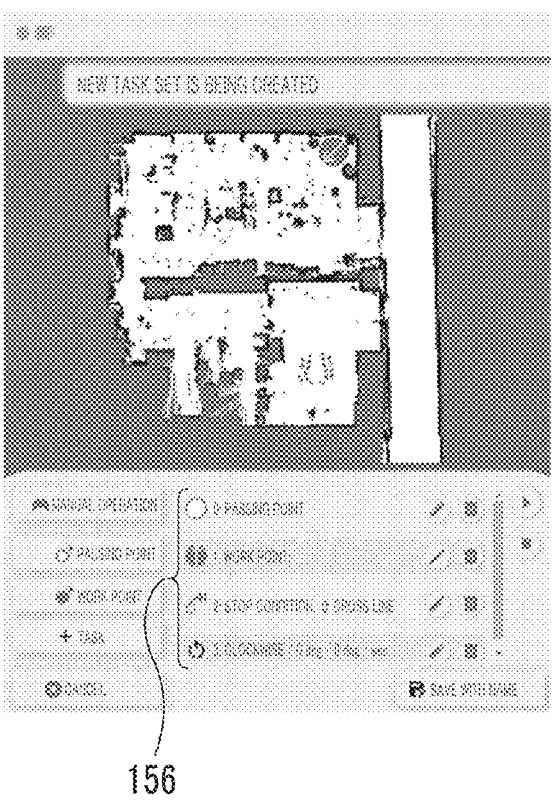
FIG. 29
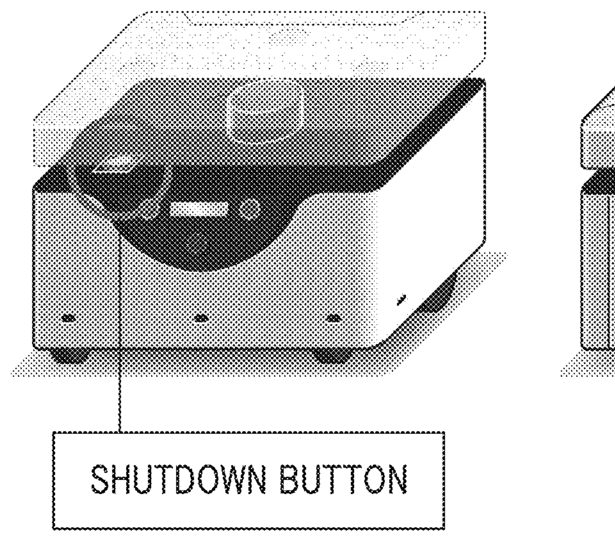
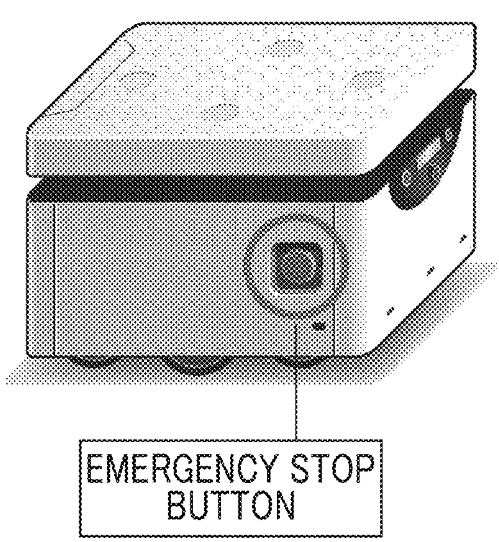

OPERATION SETTING DEVICE OF AUTONOMOUS BOGIE, NON-TRANSITORY COMPUTER READABLE MEDIUM STORING OPERATION SETTING PROGRAM, AND OPERATION SETTING METHOD

CROSS-REFERENCE TO RELATED APPLICATIONS

This is a bypass continuation of International PCT Application No. PCT/JP2022/027724, filed on Jul. 14, 2022, which claims priority to Japanese Patent Application No. 2021-117245, filed on Jul. 15, 2021, which are incorporated by reference herein in their entirety.

BACKGROUND

Technical Field

A certain embodiment of the present invention relates to an operation setting device of an autonomous bogie, an non-transitory computer readable medium storing an operation setting program, and an operation setting method.

Description of Related Art

In recent years, many companies have started selling a large number of autonomous bogies (refer to the related art).

SUMMARY

According to an embodiment of the present invention, there is provided an operation setting device of an autonomous bogie including a receiving unit that receives designation of a specific location within a traveling area of an autonomous bogie from a user, and receives designation of an operation of the autonomous bogie at the designated specific location from the user.

According to another embodiment of the present invention, there is provided a non-transitory computer readable medium storing an operation setting program, the operation setting program when executed by an operation setting device of an autonomous bogie, causing the operation setting device to: receive designation of a specific location within a traveling area of an autonomous bogie from a user; and receive designation of an operation of the autonomous bogie at the designated specific location from the user.

According to still another embodiment of the present invention, there is provided an operation setting method including: a step of receiving designation of a specific location within a traveling area of an autonomous bogie from a user; and a step of receiving designation of an operation of the autonomous bogie at the designated specific location from the user.

BRIEF DESCRIPTION OF THE DRAWINGS

FIG. 14 is an explanatory diagram of turning on and off a power supply.

FIG. 15 is a block diagram showing a functional configuration of a control device of the AMR.

FIG. 19 is an explanatory diagram of a map creation mode.

FIGS. 20A and 20B are explanatory diagrams of a wall-following map creation mode.

FIG. 21 is an explanatory diagram of a method of setting a current position.

FIG. 22 is an explanatory diagram of a method of modifying a map shape.

FIG. 23 is an explanatory diagram of a method of setting a no-travel area.

FIG. 24 is an explanatory diagram of a method of creating a task set.

FIG. 25 is an explanatory diagram of the method of creating a task set.

FIG. 26 is an explanatory diagram of buttons on a display screen of the task set.

FIGS. 27A to 27C are explanatory diagrams of the method of creating a task set.

FIGS. 28A and 28B are explanatory diagrams of the method of creating a task set.

FIG. 29 is an explanatory diagram of a shutdown button and an emergency stop button.

DETAILED DESCRIPTION

Figure 1:
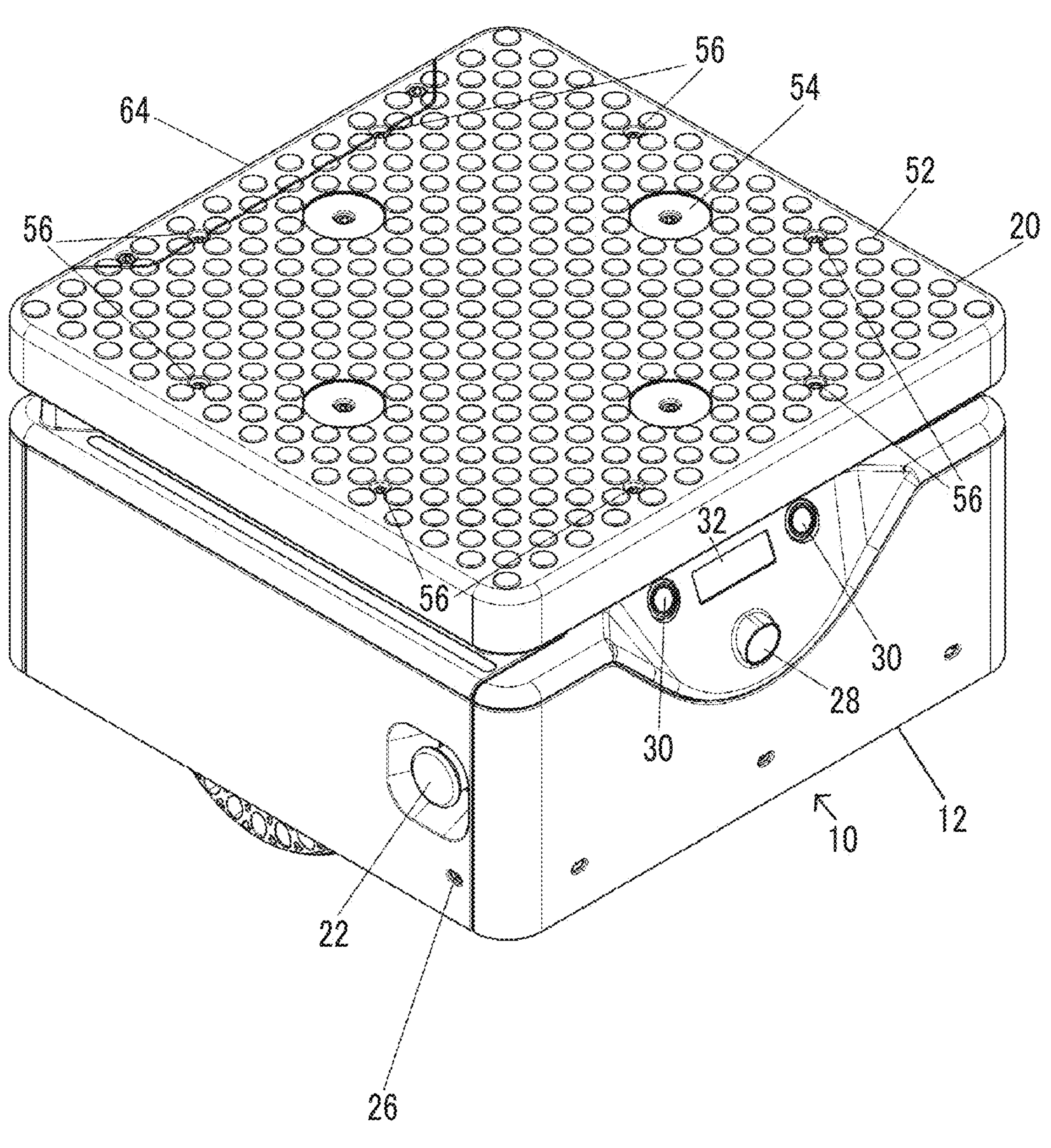
FIG. 1 is a perspective view of an AMR as viewed from an obliquely upper side.
Figure 2:
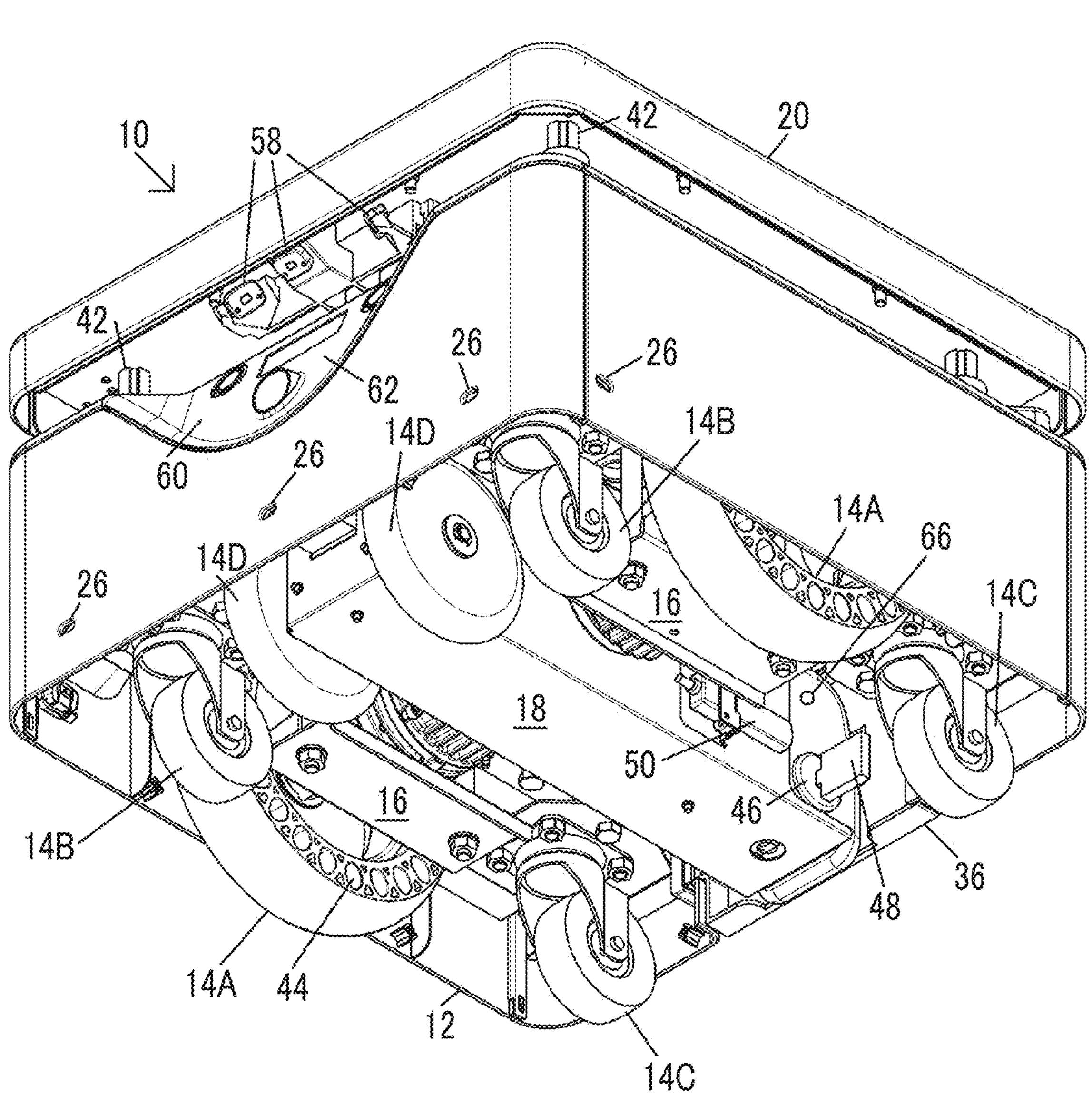
FIG. 2 is a perspective view of the AMR as viewed from an obliquely lower side.
Figure 3:
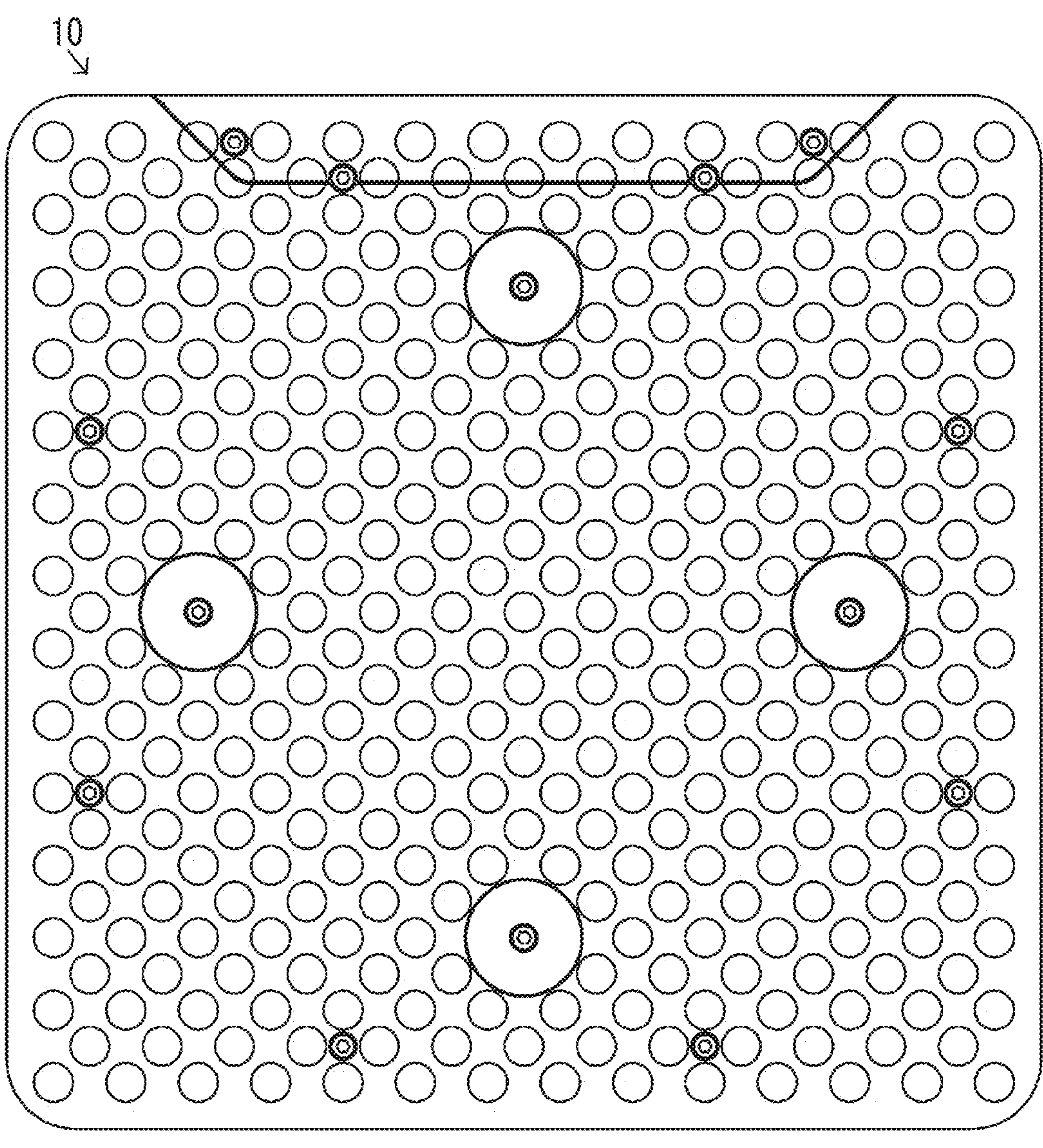
FIG. 3 is a plan view of the AMR.
Figure 4:
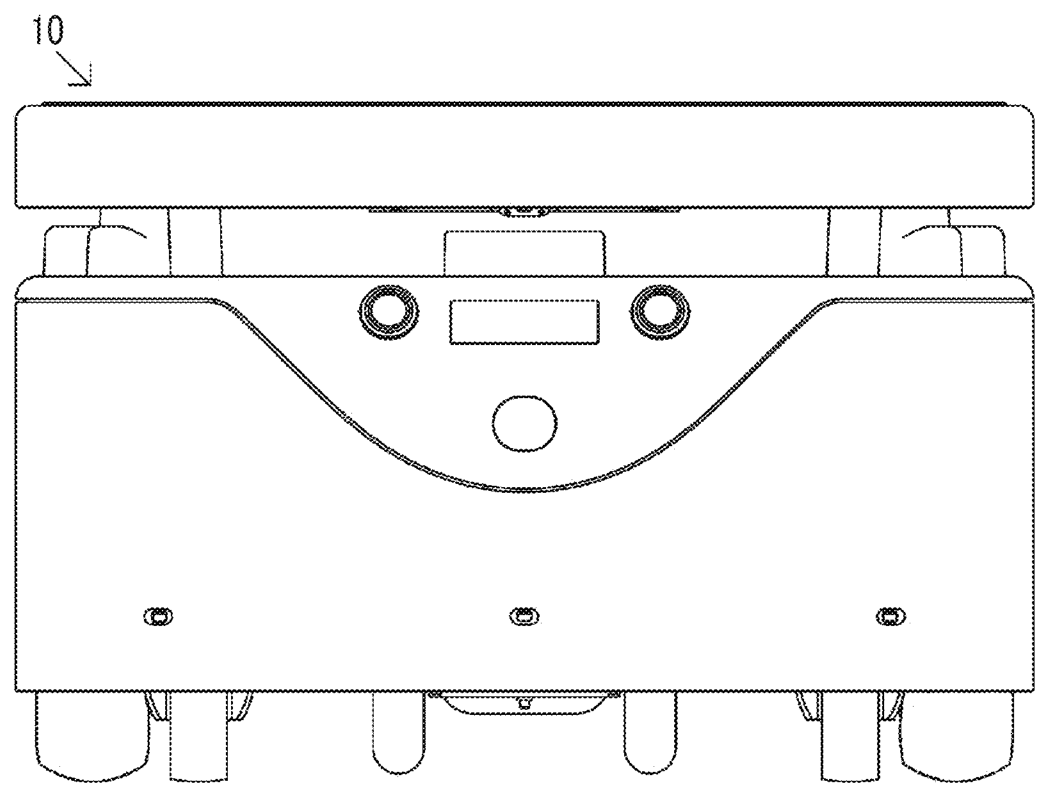
FIG. 4 is a front view of the AMR.
Figure 5:
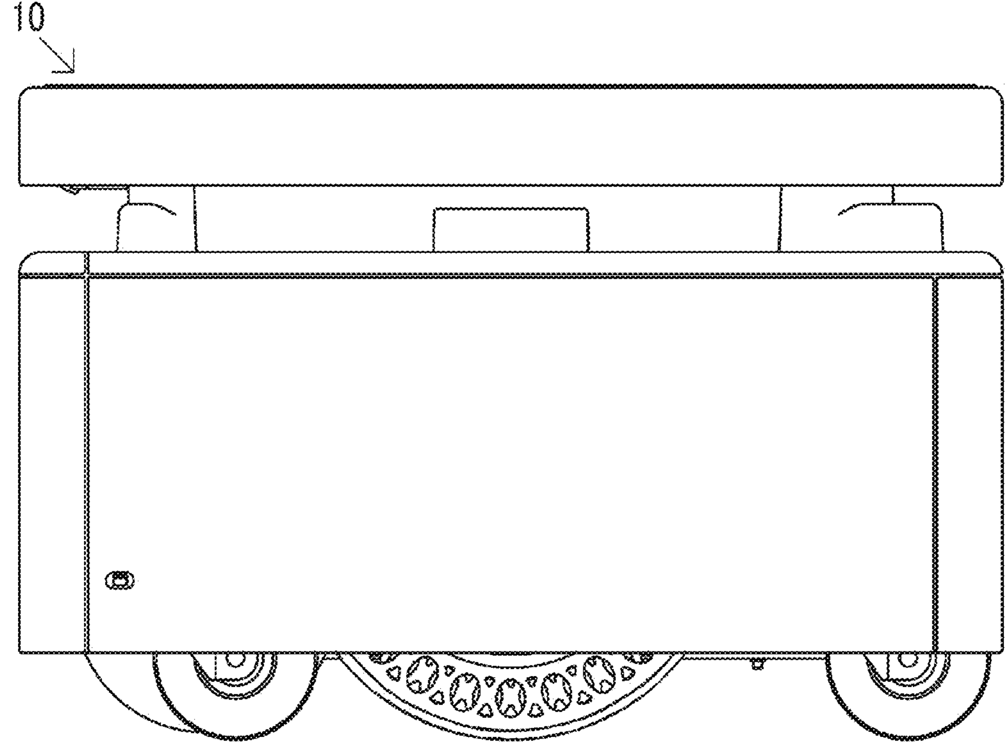
FIG. 5 is a right side view of the AMR.
Figure 6:
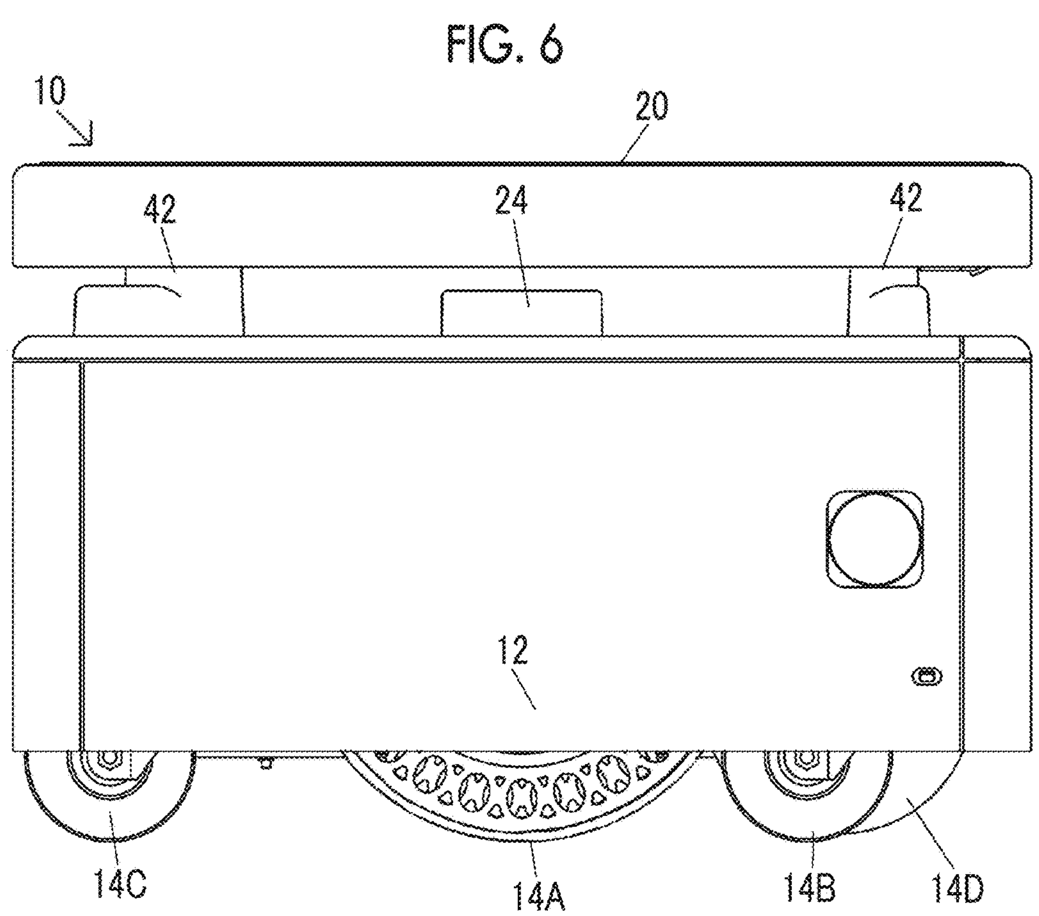
FIG. 6 is a left side view of the AMR.
Figure 7:
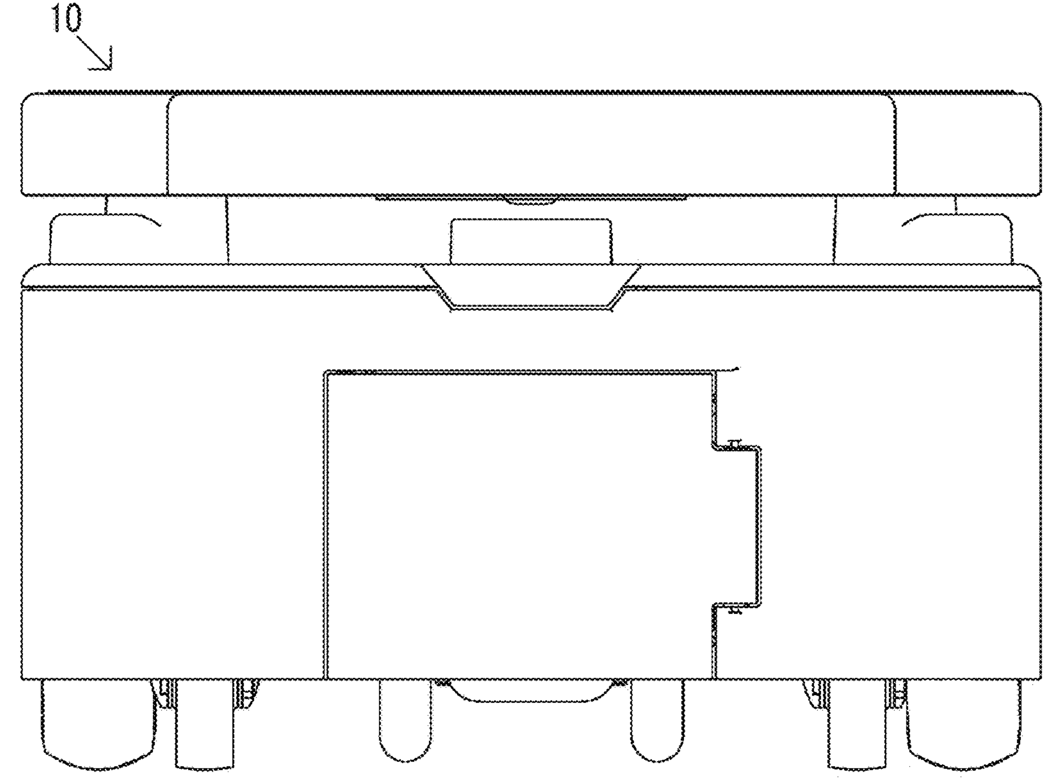
FIG. 7 is a rear view of the AMR.
Figure 8:
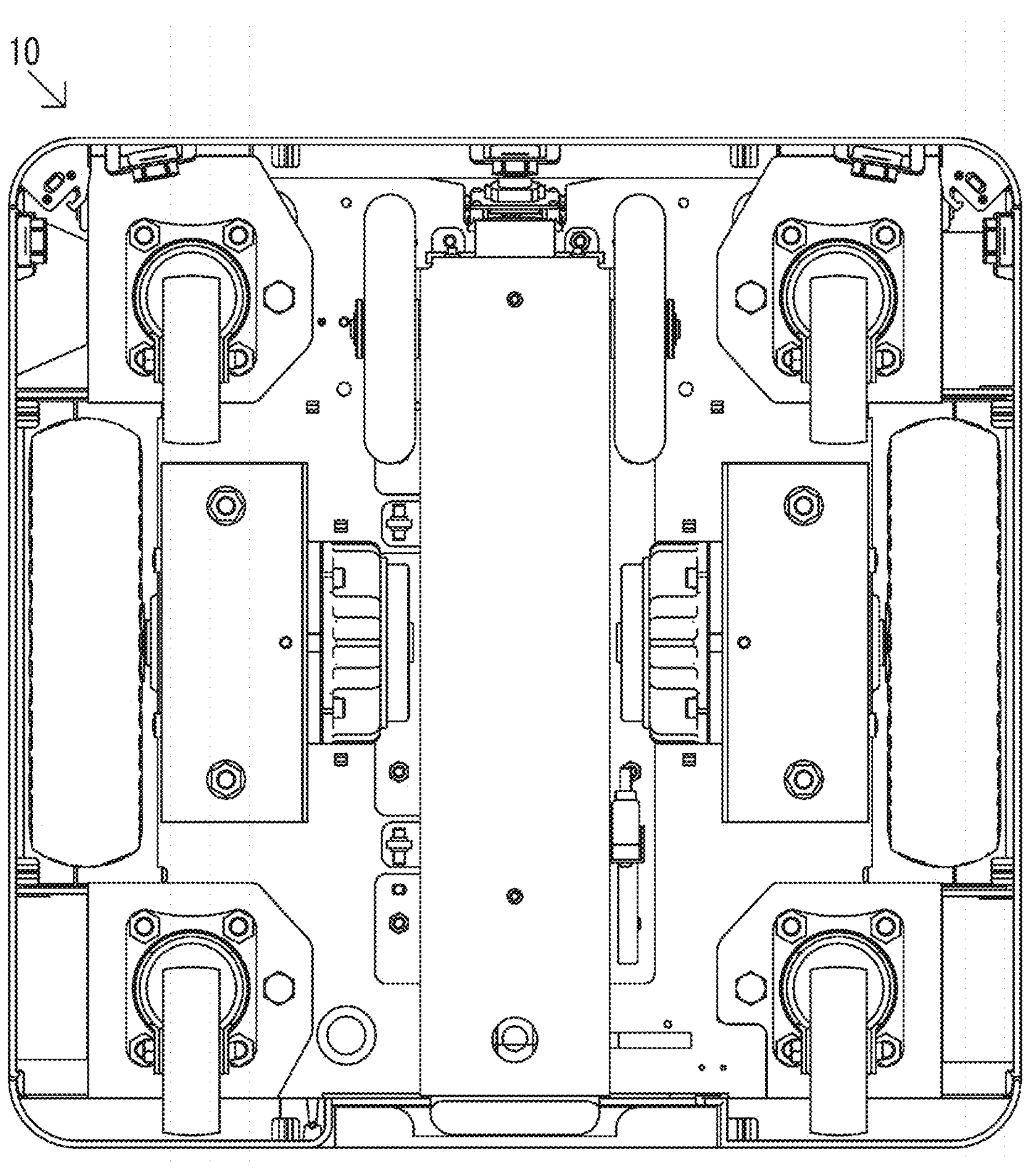
FIG. 8 is a bottom view of the AMR.
Figure 9:
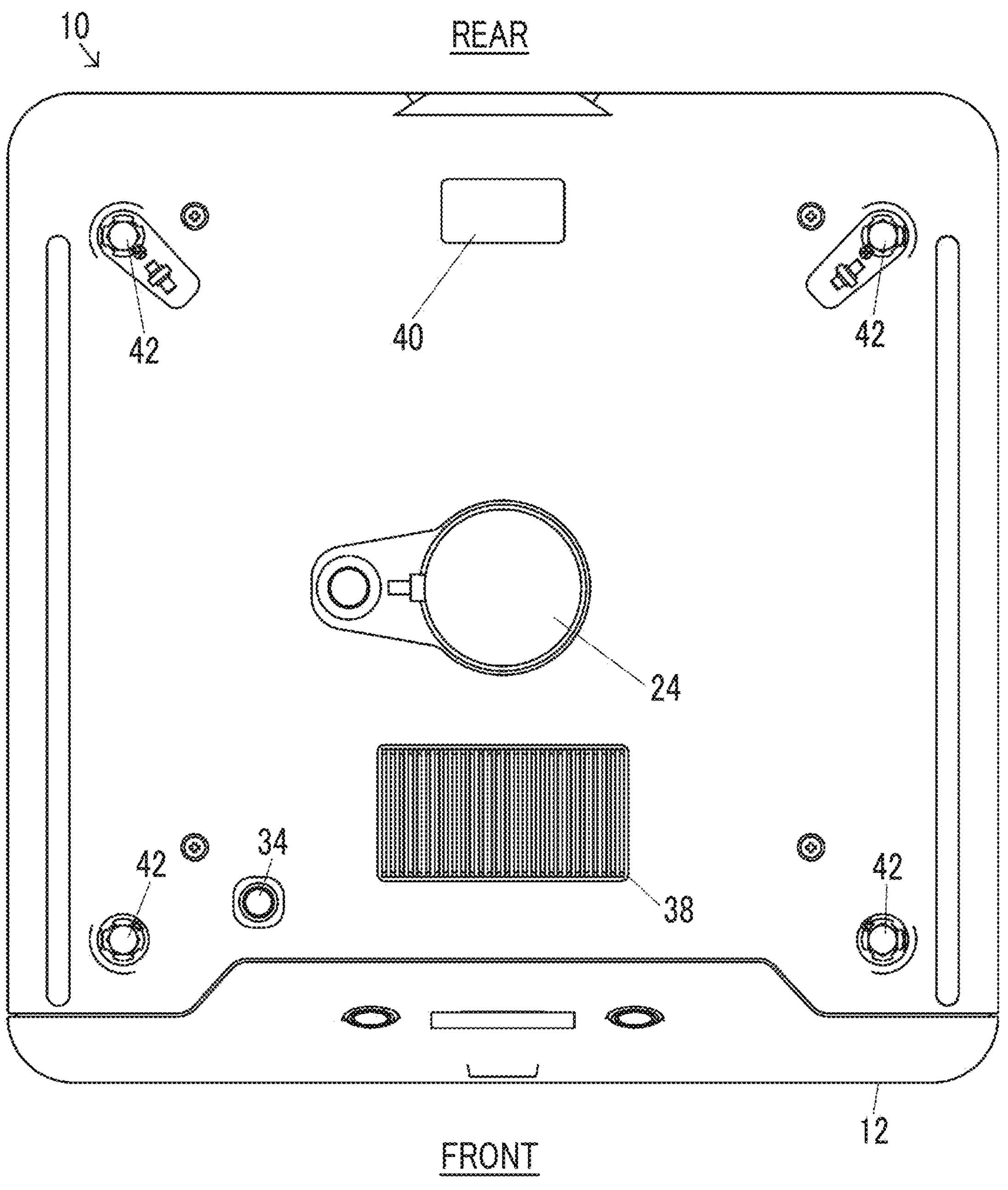
FIG. 9 is a plan view showing a state in which the top plate of the AMR is removed.

The present inventor has found a new idea that can improve usability with respect to the operation setting of the autonomous bogie.

It is desirable to provide a technique capable of improving usability regarding operation setting of an autonomous bogie.

It should be noted that any combination of the above-described components and those in which the components and expressions of the present disclosure are mutually substituted between methods, devices, systems, and the like are also effective as aspects of the present disclosure.

Hereinafter, embodiments will be described. The same reference numerals will be assigned to the same components, and repeated description will be omitted. In each drawing, for convenience of explanation, components are omitted, enlarged, or reduced as appropriate. The drawings shall be viewed according to the direction of the reference numerals.

Refer to FIGS. 1 to 9. An autonomous bogie (hereinafter, also referred to as an autonomous mobile robot (AMR)) 10 is a type of distribution robot (autonomous mobile robot) that autonomously moves to a target place, and is also type of an unmanned transport vehicle. The AMR 10 includes a main body 12, a plurality of wheels 14A to 14D, a motor 16, a battery 18, a top plate 20, an emergency stop switch 22, a sensor 24 for detecting surroundings, an obstacle sensor 26, a camera 28, an operation button 30, a display 32, and a shutdown button 34, and a battery replacement door 36. The AMR 10 has a square shape having one side of 500 mm or less in a plan view. The square here refers to a shape within a range in which the ratio of the lengths of adjacent sides is 1:1.1 or less.

The main body 12 has a box shape that opens downward. A heat sink 38 is provided on an upper surface portion of the main body 12. The heat sink 38 is exposed between the main body 12 and the top plate 20. A speaker 40 is provided on the upper surface portion of the main body 12. The speaker 40 is disposed in a gap space between the main body 12 and the top plate 20. The upper surface portion of the main body 12 has a gentle mountain shape that is convex upward in the center. Accordingly, a waterproof effect can be exhibited. A plurality of pillars 42 that support the top plate 20 are provided on the upper surface portion of the main body 12.

The plurality of wheels 14A to 14D are disposed inside the main body 12, and are attached to the main body 12 such that some wheels protrude downward from the main body 12. The plurality of wheels 14A to 14D include drive wheels 14A, two driven wheels 14B and 14C in front and behind the drive wheels 14A, and auxiliary wheels 14D inside the front driven wheels 14B in the left-right direction. A composite wheel is a set including one drive wheel 14A, two driven wheels 14B and 14C, and one auxiliary wheel 14D is individually attached to both the left and right sides of the main body 12. The AMR 10 has a six-wheel structure in which two left and right drive wheels 14A and four left and right driven wheels 14B and 14C are used when traveling on a flat ground contact surface. The outer diameter of the drive wheel 14A is large, and the outer diameters of the driven wheels 14B and 14C are smaller than the outer diameter of the drive wheel 14A. The driven wheels 14B and 14C are rotatably provided around a vertical axis. Accordingly, the main body 12 of the AMR 10 can be easily turned on the spot. A hole 44 is formed on a side surface of the drive wheel 14A. The composite wheel is attached to the main body 12 via a suspension (not shown).

The motor 16 is disposed inside the main body 12 and is attached to the main body 12. The motors 16 are individually provided in pairs inside the left and right drive wheels 14A in the left-right direction.

The battery 18 is disposed inside the main body 12 and is attached to be attachable and detachable to the main body 12. A battery replacement door 36 is provided on a rear surface portion of the main body 12. The battery 18 can be attached to and detached from the main body 12 when the battery replacement door 36 is opened. The key switch 46 is provided on a side surface portion of the battery 18. The battery 18 can be switched between ON and OFF by rotating the battery key 48 in a state where the battery key 48 is inserted into the key switch 46. As will be described later, it is possible to switch between locking and unlocking of the battery key 48 by changing the rotation position while pushing the battery key 48 toward the battery side. The battery key 48 can be pulled out from the key switch 46, when the lock to the key switch 46 is released and the battery 18 is turned off.

The battery 18 is disposed between the pair of motors 16. A circuit board or the like of a control device (described later) is stacked on the battery 18. The heat generated in the circuit board or the like is dissipated through the heat sink 38.

The data memory 50 in which the software that controls the AMR is recorded is attached to and detached from the main body 12. This facilitates software updates. The data memory 50 can be replaced when the battery replacement door 36 is opened. The data memory 50 is disposed inside the battery replacement door 36 and the battery key 48 in the front-rear direction (in front of the battery key 48). Accordingly, the data memory 50 can be replaced only when the battery key 48 is pulled out from the key switch 46 by moving the battery key 48 to OFF (that is, the power supply is turned off).

The auxiliary wheel 14D is disposed between the left and right driven wheels 14B on the front side. The outer diameter of the auxiliary wheel 14D is larger than the outer diameter of the left and right driven wheels 14B on the front side. The auxiliary wheels 14D are positioned above and apart from the ground contact surface, when the drive wheel 14A and two driven wheels 14B and 14C are in contact with the flat ground contact surface. When there is a step in the traveling direction (forward direction) of the main body 12, the auxiliary wheels 14D can reach and ride on the step before the driven wheels 14B on the front side. This improves the performance of riding on the step.

The top plate 20 is a place to place a load. The top plate 20 has a plurality of protrusions 52. This makes it difficult for the load to slip. The top plate has four recesses 54. A cushion rubber (not shown) can be attached to the recess 54. Accordingly, it is possible to improve grip on the load. The top plate 20 has a plurality of (eight in figures) mounting tapped holes 56. Various frames such as an aluminum frame can be easily mounted by being co-tightened with a screw member screwed into the mounting tapped hole 56 (see also FIG. 32).

Figure 10:
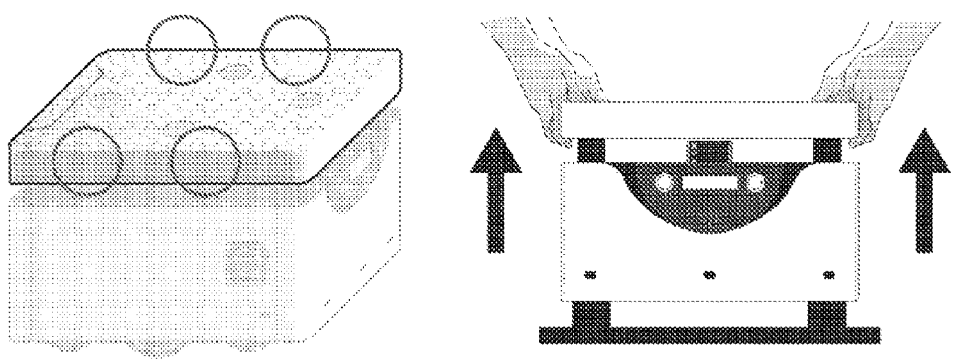
FIG. 10 is an explanatory diagram of carrying the AMR.

An obstacle detection and cliff detection sensor 58 is installed on the back side of the top plate 20. When carrying the AMR 10, two people face each other on the sides (o portions) of the top plate 20 and hold the AMR 10 with both hands (see FIG. 10). A recessed portion 60 that is recessed upward and backward is provided in an upper portion of a front surface portion of the main body 12, and a panel portion 62 in which a button and a display are disposed is provided in the recessed portion 60. The sensor 58 on the back side of the top plate 20 is an optical sensor, and projects the detection light to pass through a portion recessed by the recessed portion 60. This allows for closer detection.

An emergency stop switch 22 is provided on a side surface of the main body 12. When the emergency stop switch 22 is pressed, the supply of electric power (battery 18) to the motor 16 is instantaneously cut off.

The sensor 24 for detecting surroundings is mounted on the central portion of the main body 12. The sensor 24 for detecting surroundings is, for example, Light Detection And Ranging (LiDAR). The sensor 24 for detecting surroundings is used when creating a map or when performing autonomous driving. For example, the sensor 24 for detecting surroundings can detect an object to be detected within the detection range by receiving the reflected light of the detection light projected by the sensor 24. In the gap space between the main body 12 and the top plate 20, the sensor

24 for detecting surroundings projects the detection light into a range (excluding a range hidden by the pillar 42) that extends radially around the sensor 24 for detecting surroundings. Accordingly, the detection range can be set as wide as possible around the main body 12.

A total of five obstacle sensors 26 are mounted, that is three obstacle sensors 26 on the front surface portion of the main body 12 and one obstacle sensor 26 on each of the pair of side surface portions. The obstacle sensor 26 is used in combination with the sensor 24 for detecting surroundings to avoid an obstacle during autonomous driving. The obstacle sensor 26 is an optical sensor, and the optical axis of the detection light is directed upward by 5 degrees with respect to the horizontal plane.

The camera 28 is mounted on the front surface portion of the main body 12. The camera 28 is used to detect a line trace or a two-dimensional marker. In the case of performing line trace, a line on the floor is read by the camera 28 and traced. For example, when moving with reference to the map read into the AMR 10, the line trace may be started, with reading the line as trigger. In the case of detecting the two-dimensional marker, the camera 28 reads the two-dimensional marker (two-dimensional code) on furniture such as shelves, fixtures, and the like in addition to floors and walls. A polarizing film (not shown) is disposed in an incident path of light to an image pickup element of the camera 28. The polarizing film has an absorption axis in the horizontal direction. Thus, the line recognition rate is improved even in an environment in which sunlight shines.

The operation button 30 is mounted on the front surface portion of the main body 12. The operation button 30 is used for releasing an error or restarting.

The display 32 is mounted on the front surface portion of the main body 12. The display 32 is used for displaying the status of the main body 12, displaying the remaining battery level, and the like.

Figure 11:
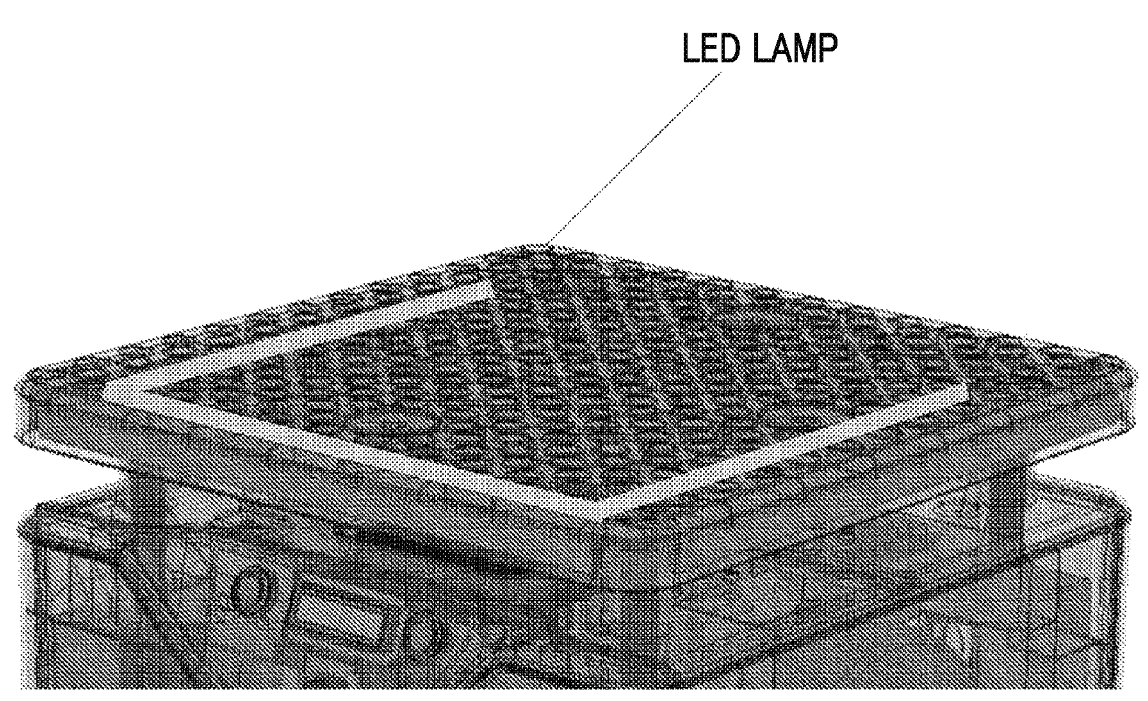
FIG. 11 is a partially transparent perspective view showing an LED lamp.

The LED lamp (also refer to FIG. 11) is disposed in a line shape along the outer periphery of the main body 12. The LED lamp is mounted on the lower surface portion of the top plate 20. The status of the main body 12 is displayed according to the color and lighting method. Green indicates a state of waiting for the operation to be received. Light blue indicates "while traveling". When changing course, the LED lamp lights up in the form of a blinker. The LED lamp turns deep blue while the map is being created. The LED lamp turns red when an error occurs.

A shutdown button 34 is mounted on the upper surface portion of the main body 12. The shutdown button 34 is used before the power supply is turned off by the key switch 46.

Figure 12:
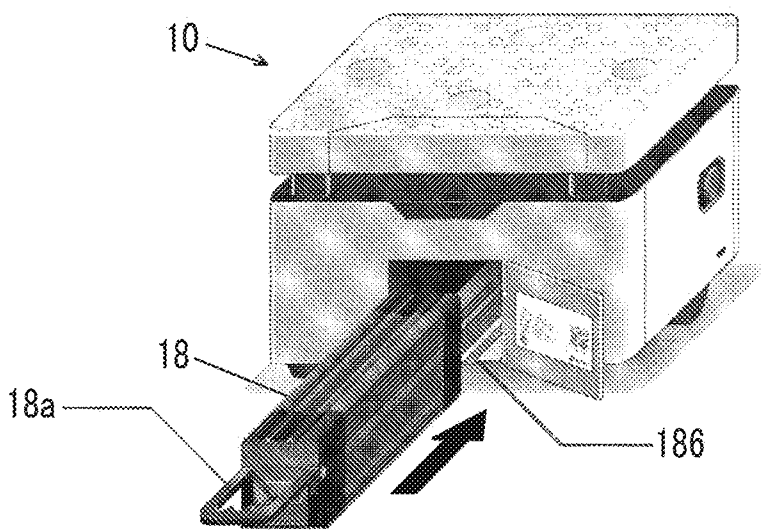
FIG. 12 is an explanatory diagram for mounting a battery.

The battery replacement door 36 is attached to a rear surface portion of the main body 12 (see also FIG. 12). The battery replacement door 36 is of a magnetic type and can be opened and closed with a single touch. A QR code (registered trademark) (not shown) to the official website is written inside the battery replacement door 36. It is possible to download the user manual from the official website.

A traveling computer (a control device 100 described later) that controls the traveling operation of the AMR 10 is mounted on the main body 12 of the AMR, and an expansion function computer for expanding the functions of the AMR is mounted on the top plate 20. By accessing the expansion function computer, the function expansion can be easily realized according to the user's application. The top plate 20 is provided with an I/O port (see also FIG. 33) for accessing the expansion function computer. The I/O port appears when the cover member 64 attached to the top plate 20 is removed. Since the same computer (for example, Raspberry Pi) is used, the traveling computer and the function expansion computer are inexpensive and have good expandability. Both the traveling computer and the function expansion computer may be provided only on either the top plate 20 or the main body 12.

Figure 13:
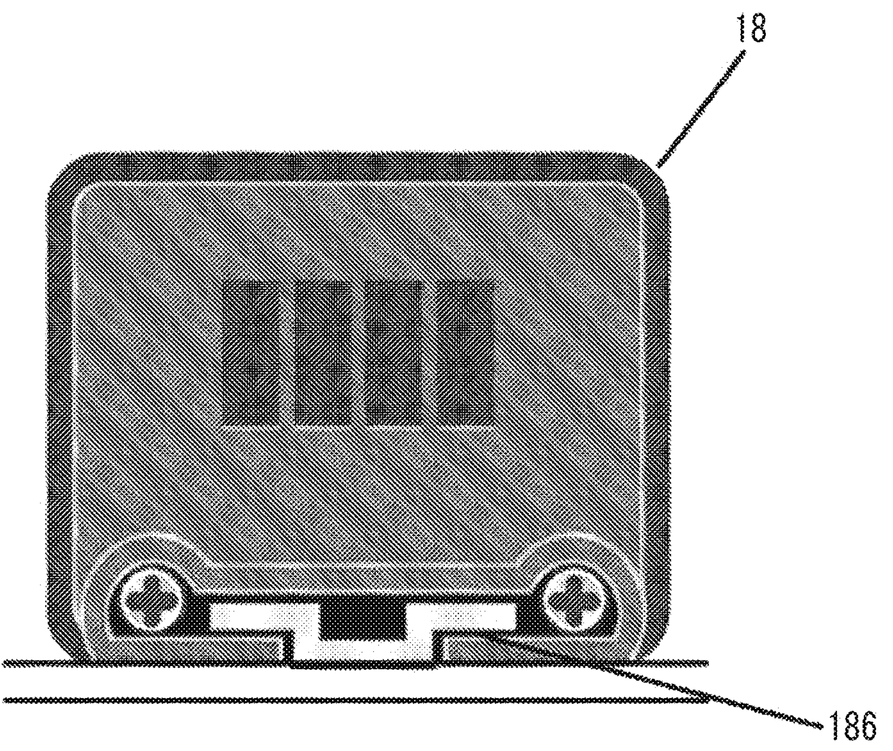
FIG. 13 is an explanatory diagram for mounting a battery.

Refer to FIGS. 12 and 13. When attaching the battery 18, the handle 18*a* of the battery 18 is held and inserted along the guide rail 186 of the main body 12 of the AMR 10.

Refer to FIG. 14. The power is input to the main body by inserting the battery key into the key switch of the battery and turning the battery key ON. When returning from OFF to UNLOCK, the battery key is turned to the UNLOCK side while pushing the battery key inward in the off state. Only in the case of UNLOCK, the battery can be removed from the main body.

Refer to FIG. 15. Each block shown in FIG. 15 can be implemented by an element or a mechanical device such as a central processing unit (CPU) of a computer in terms of hardware and is implemented by a computer program or the like in terms of software, but the functional blocks implemented by the cooperation of hardware and software are drawn. Therefore, it is understood by those skilled in the art given this specification that such functional blocks can be implemented in various manners through combination between hardware and software. The same applies to FIGS. 16 and 35, which will be described later.

The control device 100 includes a communication unit 102, a control unit 104, and a storage unit 106. The storage unit 106 is a storage area in which data referenced or updated by the control unit 104 is stored. The communication unit 102 communicates with the external device according to a predetermined communication protocol. For example, the control unit 104 transmits and receives data to and from the operation setting device 200 via the communication unit 102. The operation setting device 200 is a device for setting the operation of the AMR 10.

The control unit 104 includes a travel control unit 122, a map creation unit 124, and a task set execution unit 126. The travel control unit 122 controls the motor 16 to cause the AMR 10 to travel. The map creation unit 124 creates a map by scanning the surroundings of the AMR with the sensor 24 for detecting surroundings when the AMR 10 is traveling. The task set execution unit 126 executes a task set created as described below. A task set is a collection of at least one (typically, a plurality of) tasks such as a task that moves to a designated position, a task that sets input/output of a GPIO port (digital input/output for cooperation between an external device and AMR), and the like, in which the tasks can be executed in order. The actual operation can be performed by executing the task set. In the task set, it is possible not only to move to the destination via a plurality of points but also to cooperate with other devices.

Figure 16:
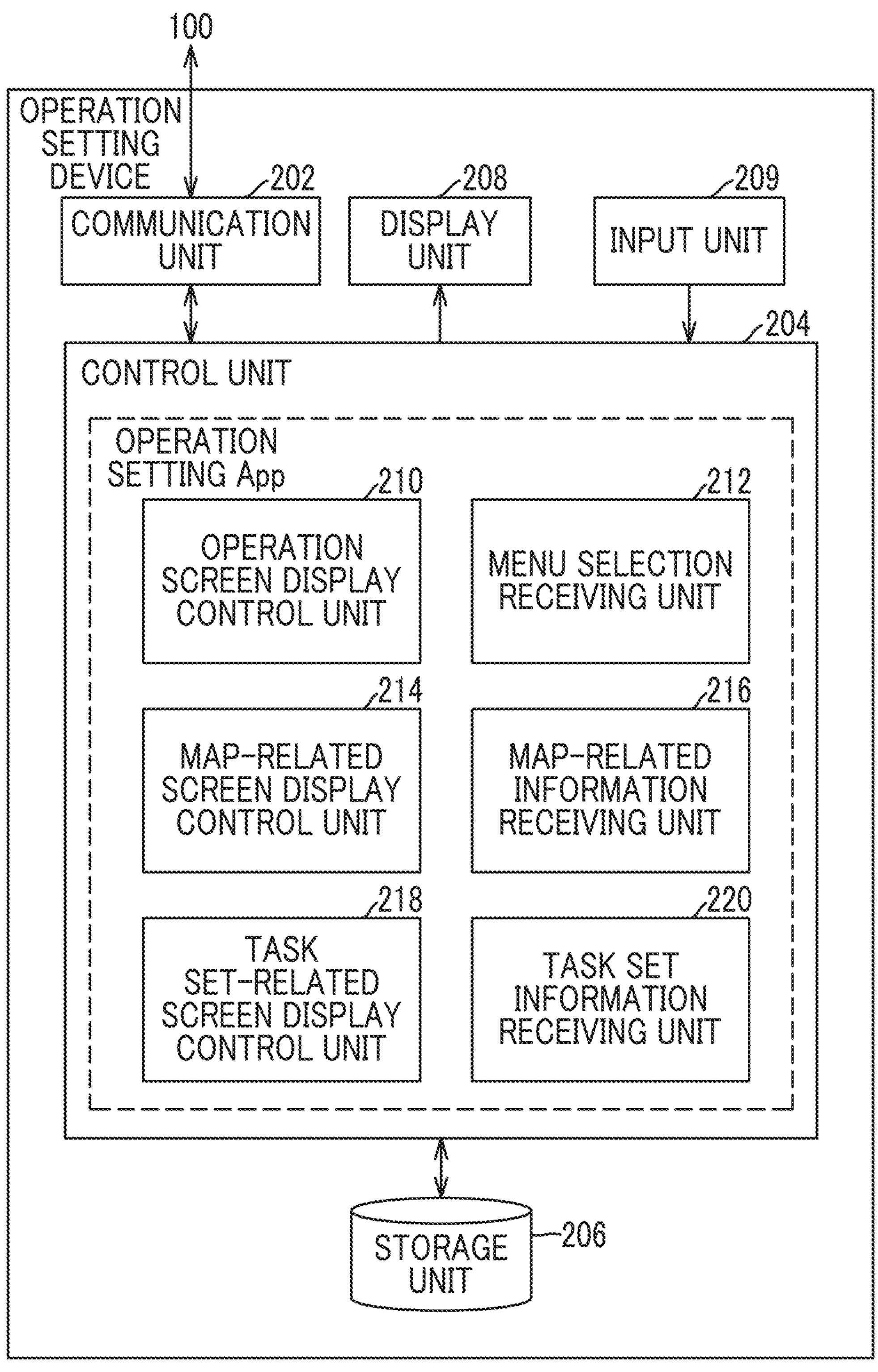
FIG. 16 is a block diagram showing a functional configuration of an operation setting device.

Refer to FIG. 16. The operation setting device 200 is an information processing device operated by a user, and is, for example, a smartphone, a tablet terminal, or a PC. The operation setting device 200 includes a communication unit 202, a control unit 204, a storage unit 206, a display unit 208, and an input unit 209. The storage unit 206 is a storage area in which data referenced or updated by the control unit 204 is stored. The communication unit 202 communicates with the external device according to a predetermined communication protocol. For example, the control unit 204 transmits and receives data to and from the control device 100 of the AMR via the communication unit 202. The display unit 208 is a display device such as a liquid crystal display or an organic EL display. The display unit 208 displays various screens provided by the control unit 204. The input unit 209 is a user interface such as a physical key or a touch panel. The input unit 209 receives the user's operation and inputs the operation content to the control unit 204. The display unit 208 and the input unit 209 may be configured as an integrated touch panel display.

The control unit 204 includes an operation screen display control unit 210, a menu selection receiving unit 212, a map-related screen display control unit 214, a map-related information receiving unit 216, a task set-related screen display control unit 218, and a task set information receiving unit 220. The function of each block of the control unit 204 is not particularly limited, but in the present embodiment, the function is implemented as a module of an application program (hereinafter, also referred to as "operation setting App") for the user of an AMR. The operation setting device 200 downloads the operation setting App from the AMR 10 as described later, and installs the operation setting App in the storage unit 206. The operation setting App may be provided by a device other than the AMR. For example, the operation setting device 200 may download the operation setting App from a site on the Internet that provides a distribution service of digital contents. Further, for example, the operation setting App may be stored in the recording medium and installed in the storage unit 106 from the recording medium. The processor (CPU, GPU, or the like) of the operation setting device 200 may perform the function of each block of the control unit 204 by reading the operation setting App installed in the storage unit 206 into the main memory and executing the operation setting App.

The operation screen display control unit 210 causes the display unit 208 to display an operation screen which is a home screen. The menu selection receiving unit 212 receives the selection of the menu input by the user on the operation screen via the input unit 209.

Figure 17:
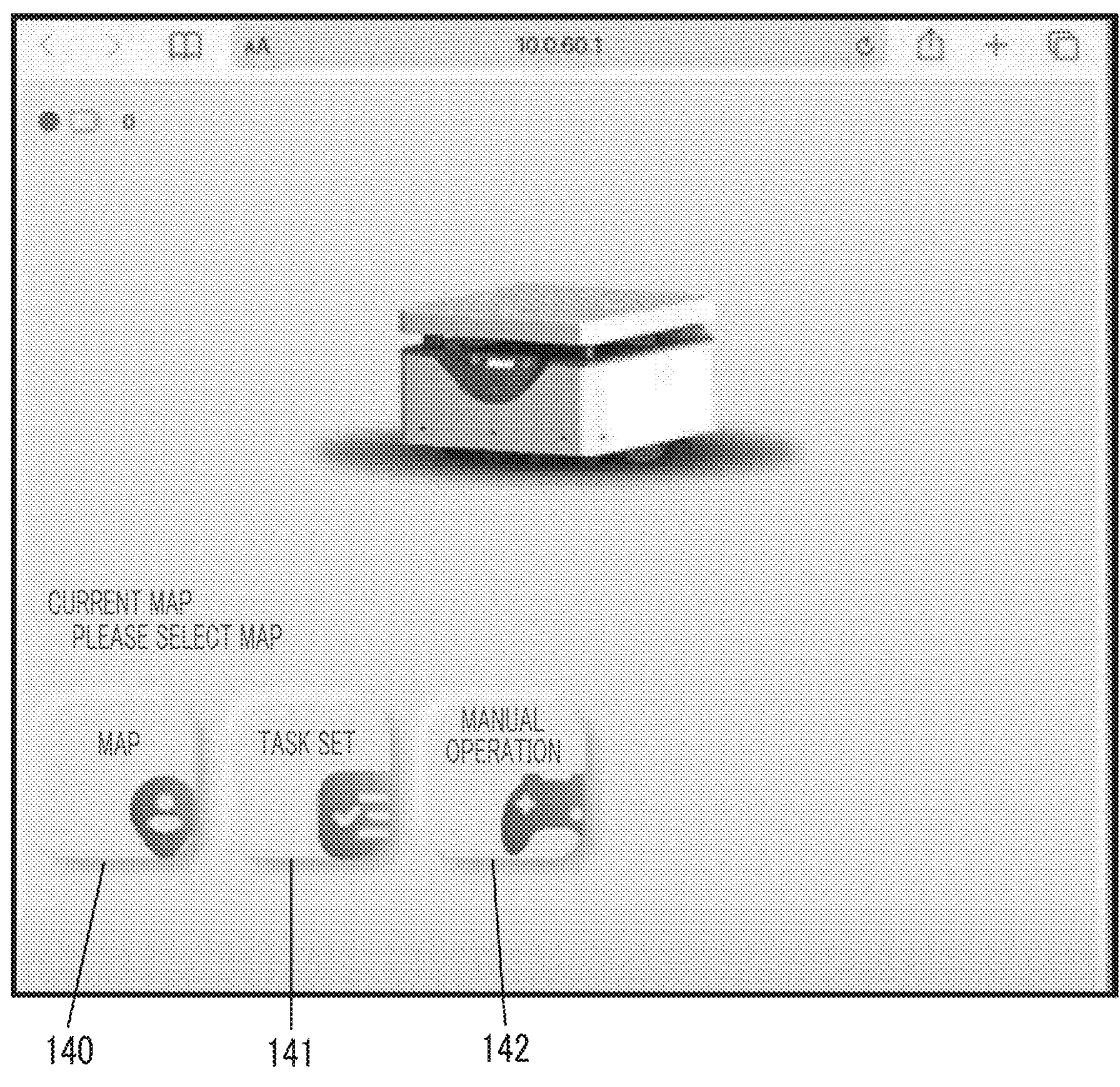
FIG. 17 is an explanatory diagram of an operation screen.
Figure 18:
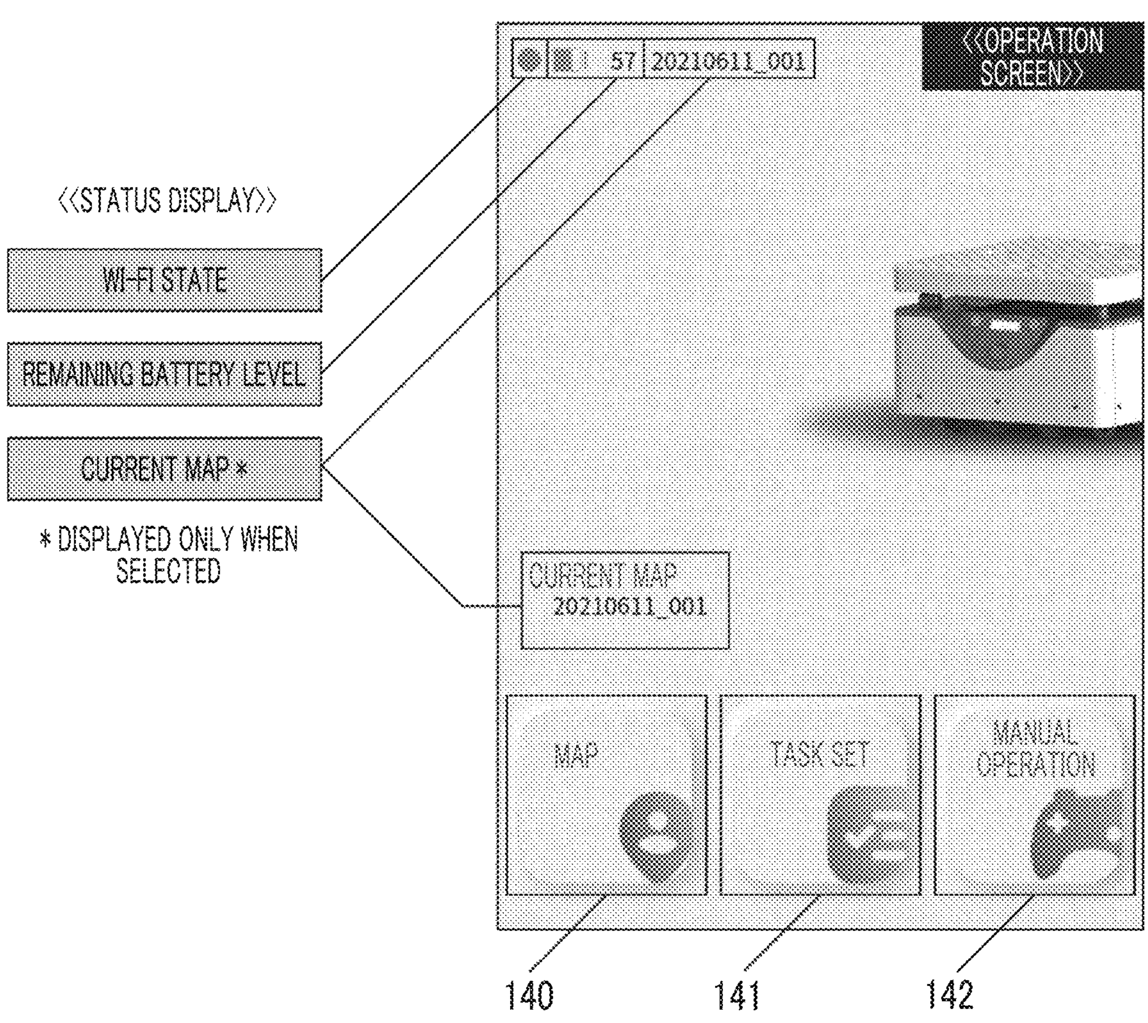
FIG. 18 is an explanatory diagram of the operation screen.

FIGS. 17 and 18 are views showing an operation screen that the operation screen display control unit 210 causes the display unit 208 to display. The operation screen will be described with reference to FIGS. 17 and 18.

Refer to FIG. 17. A method of connecting to the operation screen of the AMR will be described. First, in the operation setting device 200, the SSID of the AMR is selected on the Wi-Fi setting screen, and a predetermined password is input to connect the AMR and the operation setting device 200. Next, the browser application is activated in the operation setting device 200, and a predetermined address is input to the address bar of the browser application, whereby the address (that is, AMR) can be accessed from the operation setting device 200. When the address is accessed, the operation setting App is read, and when the operation setting App is successfully read, the operation screen display control unit 210 causes the display unit 208 to display the operation screen (home screen) of FIG. 17.

Refer to FIG. 18. On the operation screen, the Wi-Fi state, the remaining battery level, and the current map (only when a map is selected) are displayed as the status of the AMR 10. A plurality of operation buttons for operating the AMR are displayed on the operation screen. By selecting any one of the plurality of operation buttons, a menu screen corresponding to the operation button can be opened. Here, as a plurality of operation buttons, a map button 140 for creating a map, a task set button 141 for creating a task set, and a manual operation button 142 for manual operation are displayed on the operation screen from the left side to the right side in the figure.

When the map button 140 is selected, a mode for creating a map is executed. By making the AMR recognize the map created by using this, autonomous driving becomes possible. When the task set button 141 is selected, a task set is created. When the manual operation button 142 is selected, an operation icon such as a joystick is displayed on the lower right of the screen of the operation setting device, for example. By operating this operation icon, the AMR can be manually moved. Therefore, the operation icon displayed on the screen of the operation setting device, and thus, the operation setting device 200 functions as an operation unit that performs the traveling operation of the AMR.

Returning to FIG. 15, the map-related screen display control unit 214 causes the display unit 208 to display various screens (hereinafter, also referred to as "map-related screens") relating to the creation of the map. The map-related information receiving unit 216 receives information relating to the creation of the map input by the user on the map-related screen via the input unit 209.

The travel control unit 122 of the AMR causes the AMR 10 to travel according to the mode received by the map-related information receiving unit 216. In the manual map creation mode, the travel control unit 122 causes the AMR 10 to travel according to traveling operation information (operation information for the joystick) received by the map-related information receiving unit 216. The travel control unit 122 causes the AMR 10 to travel along the wall in the wall-following map creation mode. The map creation unit 124 creates a map by scanning the surroundings of the AMR with the sensor 24 for detecting surroundings when the AMR 10 is traveling under the control of the travel control unit 122.

FIGS. 19 to 23 are examples of map-related screens displayed on the display unit 208 by the map-related screen display control unit 214. The creation of the map will be described in more detail with reference to these.

Refer to FIG. 19. A mode for creating a map will be described. The map is essential for autonomous driving. First, the screen of "1." is displayed. On this screen, when a created map is present, a list of created maps is displayed. On this screen, the map can be read into the AMR, and the current position can be set, edited, and deleted. To create a new map, the + icon 143 at the lower right of this screen is selected. Then, the screen of "2." is displayed. The AMR can be moved with the operation icon (joystick) 144 on this screen.

The map-related information receiving unit 216 receives the operation information for the operation icon and thus the traveling operation information for the AMR, and transmits the received traveling operation information to the control device 100 of the AMR at a predetermined cycle. The travel control unit 122 of the AMR causes the AMR to travel according to the traveling operation information transmitted by the map-related information receiving unit 216. In this case, the map creation unit 124 scans the surroundings of the AMR by the sensor 24 for detecting surroundings to create a map.

When the screen of "2." is displayed, the LED lamp of the AMR changes from green to deep blue. When the AMR is moved, the scanned area can be created as a map by scanning the surroundings of the AMR with the LiDAR of the AMR. A map may be created by moving the AMR with a joystick to cover a range that is as large as possible than an actual operation range. The created map can be saved by selecting the save button 145 on the screen of "2." and inputting the map name. The saved map is automatically read, and selected as the "current map".

Refer to FIGS. 20A and 20B. FIG. 20A is another screen view displayed when the map is created. FIG. 20B is an explanatory diagram of the wall-following map creation mode. In this example, when moving the AMR for scanning the map, it is possible to execute the wall-following map creation mode in addition to the manual map creation mode in which the AMR is moved by the operation icon. The wall-following map creation mode can be selected by pressing the wall-following mode button corresponding to the wall-following map creation mode. FIG. 20A shows a left wall-following mode button 146 and a right wall-following mode button 147. Each of the wall-following mode buttons 146 and 147 is a button for traveling along the wall in the designated direction, with either the left direction or the right direction as viewed from the AMR as a designated direction. That is, the button is a button for traveling along a wall on either the left side in the traveling direction or the right side in the traveling direction of the AMR. Only one wall-following mode button may be displayed without distinguishing between the left and right walls. When there is only one wall-following mode button, the AMR travels along the wall whichever is closer among walls on the left or right side of the AMR. In a case where there are two wall-following mode buttons corresponding to the left and right as in FIG. 20A, wall-following driving is performed along the wall in the designated direction corresponding to the wall-following mode button. FIGS. 20A and 20B show an operation when a left wall-following mode button 146 is selected in a case where the wall is on the left side of the AMR. By selecting this button, the wall-following driving is performed along the wall in the left direction (designated direction corresponding to the button). During the wall-following driving, a stop button for stopping the wall-following driving may be displayed.

When the wall-following map creation mode is selected, the map-related information receiving unit 216 receives the selection of the wall-following map creation mode, and transmits the selected mode to the control device 100 of the AMR. The travel control unit 122 of the AMR causes the AMR to travel along the wall while detecting the wall by the sensor 24 for detecting surroundings according to the selected mode (the left wall-following mode or the right wall-following mode). In this case, the map creation unit 124 scans the periphery of the AMR by the sensor 24 for detecting surroundings to create a map. That is, in the wall-following map creation mode, the AMR can automatically scan and create a map while traveling along the wall. Accordingly, the map can be created without manually moving the AMR, and the burden on the user can be reduced. Further, for example, the map can be created outside of working hours, such as at night, and the time can be effectively used. Further, for example, the map can be created in a time zone when there are few or no people, such as at night, and it is possible to prevent people from being reflected on the map. In addition, with respect to the wall-following traveling in the wall-following map creation mode, the traveling speed or the distance from the wall may be designated.

Refer to FIG. 21. A method of setting the current position on the created map will be described. When the map is changed, the AMR is moved with the power turned off, or the position is lost for some reason, it is necessary to set the current position. In order to set the current position, it is necessary to read the map into the AMR in advance. First, in a state where the created map is read, the "current position setting" displayed on the screen of "1." is selected. Then, since the icon of the AMR is displayed on the screen of "2.", the current position can be set by moving the icon to the current location while comparing the scenery with the map while dragging the icon. In this case, the direction of the AMR can also be set by rotating the icon of the AMR.

After that, when the "Set current position" button at the bottom of the "2." screen is pressed, a screen asking whether the setting of the current position is completed is displayed as in "3.", OK on the screen is selected. Accordingly, the setting of the current position is completed.

Refer to FIG. 22. A method of modifying the map shape of the created map will be described. The map shape is modified to delete people or moving objects (such as bogies, loads, or moving shelves that are not normally used) from the map when they are reflected in the created map. The deleted area is recognized as a travelable area and is not used as a reference for self-positioning.

First, in a state where the map to be modified is selected, "Modify map" displayed on the screen of "1." is selected. Then, since the screen of "2." is displayed, the button displayed on the screen is pressed to designate the deletion range. A plurality of the deletion ranges can be designated. This deletion range can be enlarged or reduced by a pinch operation, or can be rotated by performing a predetermined operation.

The screen of "3." shows a state in which the deletion range is designated. After designating the deletion range, the save button is selected to save the map in which the deletion range is reflected. Accordingly, when there is no obstacle in the designated deletion range, the AMR recognizes the deletion range as the travelable area and can travel there.

Refer to FIG. 23. A method of setting a no-travel area will be described with respect to the created map. The no-travel area is recognized as an area where the AMR cannot enter. Accordingly, for safety reasons, it is possible to designate a place or the like where the AMR is not wanted to travel. For example, since the AMR may pass under a desk or a shelf, it is preferable to set these as no-travel areas.

First, in a state where the map to be modified is selected, the "installation of obstacles" displayed on the screen of "1." is selected. Then, since the screen of "2." is displayed, the button displayed on the screen is pressed to designate the installation range. A plurality of the installation ranges can be designated. This installation range can be enlarged or reduced by a pinch operation, or can be rotated by performing a predetermined operation.

The screen of "3." shows a state in which the installation range is designated. After designating the installation range, the save button is selected to save the map in which the installation range is reflected. Accordingly, even when there is actually no obstacle at the designated location, the AMR recognizes the location as a no-travel area and cannot travel there. The map information created and modified as described above is transmitted to the control device 100 of the AMR by operating the "read into the main body" button on the screen shown in "1." of FIG. 19 and is stored in the storage unit 106, and autonomous travelling of the AMR becomes possible based on the map.

Returning to FIG. 15, the task set-related screen display control unit 218 causes the display unit 208 to display various screens (hereinafter, also referred to as "task set-related screens") relating to the creation of the task set. The task set information receiving unit 220 receives the information relating to the task set created as described below, that is, the information relating to the task set input on the task set-related screen by the user (hereinafter, also referred to as "task set information") via the input unit 209. The task set information receiving unit 220 stores the received task set information in the storage unit 206 in association with an identifier (for example, a name) by which the task set information can be uniquely identified. The task set information receiving unit 220 may transmit the task set information to the control device 100 of the AMR and store the task set information in the storage unit 106.

The task set includes one piece or a plurality of pieces of task information. The task information includes information indicating a specific location, that is, a point on a map on which a task (that is, a predetermined operation) is executed within a traveling area where the AMR 10 can travel, and information indicating a task executed by the AMR 10 at that point. That is, the user inputs a specific location and a task to be executed by the AMR 10 at the specific location, on the task set-related screen.

Upon receiving a task set execution instruction from a user via the operation setting device 200, the task set execution unit 126 of the AMR controls the AMR to execute the task included in the task set information, according to the corresponding task set information. In a case where the task set information is stored in the storage unit 206 of the operation setting device 200, the task set information may be transmitted from the operation setting device 200 together with the execution instruction, and when the task set information is stored in the storage unit 106 of the control device 100, the task set execution unit 126 may acquire the task set information from the storage unit 106.

FIGS. 24 to 26 are examples of task set-related screens that the task set-related screen display control unit 218 causes the display unit 208 to display. The creation of the task set will be described in more detail with reference to these.

Next, a mode for creating a task set will be described. Refer to FIGS. 24 to 26. First, the "task set" is selected from the operation screen of "1.". Then, the screen of "2." is displayed. A list of created task sets is displayed on this screen, and the task sets can be played (executed), edited, or deleted. When the + icon 148 at the lower right of this screen is selected, the screen of "3." is displayed, and a new task set can be created. The screen of "3." indicates a state in which "manual operation" is selected. In this case, it is possible to designate a point where the task is to be installed by moving the AMR to a point where the task is to be installed (that is, a specific location) with an operation icon (not shown) such as a joystick. That is, when receiving the designation of the specific location while the user causes the AMR to travel with the operation icon, the task set information receiving unit 220 receives the location where the AMR is present as a specific location. Accordingly, a desired point can be reliably designated as a specific location. Here, "while the AMR is caused to travel" herein includes, in addition to the case where the operation icon is operated to actually cause the AMR to travel, a case where the operation on the operation icon is interrupted, and therefore the AMR is temporarily stopped. In addition, when the AMR is traveled with a manual operation for creating a map, after the AMR reaches a point where a task is to be installed, the point may be designated as a specific location. Alternatively, after the map is created, in a state where the current position of the AMR on the map is specified, the AMR is traveled with a manual operation, after the AMR reaches a point where a task is to be installed, the point may be specified as a specific location.

On the screen of "3.", after the point 149 displayed on the screen of "3." (also refer to the screen of "4.") is tapped to turn to an active state, the point is dragged to designate a point where a task is to be installed. That is, a specific location may be designated on the map after the map is created or in a range where the map is created during the creation of the map.

"4." indicates a state in which a specific location is designated. After the specific location is designated, the task (that is, the operation) at the specific location is designated. In this example, either a "work point" or a "passing point" is selected. A "work point" is a point at which the AMR is stopped, and a "passing point" is a point through which the AMR is passed. At the "work point", the direction of the AMR when the AMR is stopped can also be designated. At the "work point", one or a plurality of different tasks such as output of the GPIO can be executed after the AMR is stopped. The task set information receiving unit 220 receives input about a task at the specific location.

When the "work point" and the "passing point" are selected, the color changes (for example, changes from blue to red) as in the screen of "5.". The point where this task is installed can be moved or set in other ways.

On the screen of "5.", a traveling route 157 in the task set is displayed on the map. In this example, the traveling route 157 is displayed by an arrow. A mark indicating that the specific location is either a work point or a passing point is displayed. The work point and the passing point are displayed with different marks from each other. In this example, the work point mark 158 is displayed by a triangular arrow, and the passing point mark 159 is displayed by a circle. That is, whether the specific location is a passing point or a work point is displayed to be identifiable. The task execution order is displayed in ascending order adjacent to each of the work point mark 158 and the passing point mark 159. Therefore, by viewing the display of the map reflecting the task set, the user can identify at a glance the traveling route of the AMR in the task set, a point on the traveling route where the task is to be executed, and whether the task to be executed is passing through of the AMR or working.

After the setting for installing the task is completed, save, is selected, and the task set is saved with a name, as shown in the screen of "6.". Specifically, the task set information receiving unit 220 stores at least one piece of received task information (information indicating a specific location and information indicating a task content at a specific location) in the storage unit 106 as a task set.

A list of the created task sets is displayed on the screen of "2.". The function of the button displayed on the right side of the task set on the screen of "2." is shown in FIG. 26. By pressing the play button on the screen of "2.", the created task set can be played. Specifically, trial driving for causing the AMR to execute the task set becomes possible. It is also possible to stop playing (trial driving) the task set by pressing the stop button on the screen of "2.". It is desirable to perform a trial driving by playing the created task set. In the case of entering an unintended route in the trial driving, it is advisable to set the no-travel area by using the map editing function. When an unintended operation is performed in the trial driving, the task may be adjusted by using a task set editing function. The adjustment by the map or task set editing function may be repeated until the intended operation can be performed in the trial driving.

Refer to FIGS. 27A to 28B. FIGS. 27A to 28B are other screen views displayed when the task set is created. When the "task set" is selected on the operation screen (for example, FIG. 17), the screen of FIG. 27A is displayed. A list of created task sets is displayed on this screen, and the task sets can be played, edited, or deleted. When the + icon 150 at the lower right of this screen is selected, the screen of FIG. 27B is displayed, and a new task set can be created. When a manual operation button 151 on the left side of the screen of FIG. 27B is selected, the screen of FIG. 27C is displayed. An operation icon 152 such as a joystick is displayed at the lower right of the screen of FIG. 27C. By moving the AMR with the operation icon to a point where the task is to be installed, the point can be designated as a specific location. On the screen of FIG. 27C, a specific location may be designated on the map, after tapping the passing point button 153 or the work point button 154 to turn to an active state.

As described above, at the "work point", one or a plurality of tasks can be executed after the AMR is stopped. When setting a task, a task button 155 is selected. When the task button 155 is selected, a plurality of pieces of selectable work are displayed, as shown in the screen of FIG. 28A. That is, in this example, the task to be executed at the "work point" can be selected from a plurality of pieces of work prepared in advance. In this case, since the user may select a desired work from a plurality of pieces of work prepared in advance, the burden on the user regarding the creation of the task set can be reduced. As shown in the screen of FIG. 28B, the selected tasks are arranged in the task display column 156 in ascending order or descending order, that is, in the execution order.

The plurality of pieces of work are not particularly limited, but in the example of FIG. 28A, the work is waiting for a certain period of time, GPIO input wait, GPIO output, line trace, rotation, straight-ahead, audio play, power output, and maximum speed change.

In the "waiting for a certain period of time", the AMR waits at the work point for a designated waiting time. For example, when the standby button for a certain period of time is selected, another screen is displayed and the waiting time can be designated.

In the "GPIO input wait", the AMR 10 waits for the input of a predetermined signal from the external device. For example, the AMR may wait for the input of a signal from the load loading sensor that outputs a signal when the load is loaded on the AMR. In this case, it is possible to perform a step of restarting the traveling when the load is loaded.

In the "GPIO output", the AMR 10 outputs a predetermined signal to the external device. For example, when a roller conveyor is attached to the AMR, a drive signal may be output to the roller conveyor. Accordingly, it is possible to implement a step of delivering the load from the roller conveyor on the AMR to another roller conveyor as an external device when the AMR arrives at a specific location. In this case, after a predetermined time has elapsed since the load has been delivered, for example, a signal (stop signal) may be output to the roller conveyor on the AMR to stop the roller conveyor.

In the "line trace", the line trace in which the AMR moves along the line is started from a work point (that is, a specific location). The details of the line trace will be described later.

The "rotation" refers to rotation at a designated angular speed by a designated rotation angle in the work point. For example, when a rotation button is selected, another screen is displayed, and the angular speed and the rotation angle can be designated.

"Straight-ahead" means to go straight for a designated distance at a designated speed in the same direction from the work point. For example, when a straight-ahead button is selected, another screen is displayed and the speed and distance can be designated.

In the "audio play", predetermined audio is played from the speaker 40. For example, audio saying "Arrived" is output.

In "power output", power is output to an external device. For example, as will be described later with reference to FIGS. 32 and 33, a power is output from the relay output port to an external device (for example, a tablet).

The "maximum speed change" changes the maximum speed of the AMR to a designated speed. For example, when a maximum speed change button is selected, another screen is displayed and the maximum speed can be designated. Accordingly, the maximum speed of the AMR in the subsequent predetermined task can be changed. For example, when the maximum speed of the AMR is changed before the line trace and the maximum speed of the AMR is returned after the line trace, the maximum speed of the AMR can be changed only during the line trace.

The work at the work point is not limited to these. For example, "obstacle sensor ON/OFF switching" may be included in the predetermined work. The "obstacle sensor ON/OFF switching" switches the obstacle sensor 26 between ON and OFF. For example, in a case where the obstacle sensor 26 reacts and stops in a narrow passage, the obstacle sensor 26 is turned off only while passing through the narrow passage. Specifically, the obstacle sensor 26 is turned off at a work point in front of a narrow passage, the obstacle sensor 26 goes straight for a designated distance after the obstacle sensor 26 is turned off, and the obstacle sensor 26 is turned on after the obstacle sensor 26 goes straight for a designated distance.

The task set created as described above is stored in the storage unit 206 of the operation setting device 200, transmitted to the AMR, and stored in the storage unit 106 of the control device 100. When a task set to be executed by the AMR is selected in the operation setting device 200, the execution instruction information indicating the task set is transmitted to the AMR, and the control unit 104 of the AMR causes the AMR to repeat the movement and the work according to the task set. In addition, without storing the created task set in the storage unit 106 of the control device 100 in advance, when the task set to be executed by the AMR is selected in the operation setting device 200, the execution instruction information including the contents of the task set may be transmitted to the AMR, and the control unit 104 of the AMR may cause the AMR to repeat the movement and the work according to the task set included in the execution instruction information.

Refer to FIG. 29. In a case of turning off the power, first, the shutdown button is pressed and held to shut down the main controller, and then the power of the battery is turned off. When the main body is stopped in an emergency, the main body can be stopped suddenly by pressing the emergency stop button.

The battery 18 can be charged using a household power supply by using a charger in a state of being removed from the main body 12. When the cable of the charger is connected to the charging port 66 (refer to FIG. 2) on the side surface of the battery 18, charging starts automatically. When charging is completed, the LED (not shown) of the charger changes from orange to green. The battery 18 is inserted along the rail (see also FIG. 13). After the battery 18 is inserted all the way, the key switch 46 is locked by pushing the key switch 46 toward the battery 18 together with the battery key and turning the battery key clockwise. In this case, the state changes from the "UNLOCK" state in FIG. 14 to the "OFF" state. The power supply is turned ON by further turning the key switch 46 clockwise from the locked state together with the battery key ("ON" state in FIG. 14). When the power supply is turned on, the LED lamp of the main body 12 is turned on while changing to seven colors. When the preparation of the main body 12 is completed, the color of the LED lamp no longer changes and turns green, and at the same time, the remaining battery level is displayed on the display 32. With this, connection can be made to the main body 12 with Wifi (registered trademark) and it can also be prepared to receive operations. When the power supply of the main body 12 is turned off, the main controller is completely shut down by pressing the shutdown button 34 in advance. When the shutdown is completed, the LED lamp is turned off. When the LED lamp is turned off, the key switch 46 of the battery 18 is moved to OFF (the "OFF" state in FIG. 14). With this, the power supply is turned off.

In an actual operation, the URL is accessed by inputting a predetermined URL in the address bar of the browser application. When the URL is accessed and the application is read, the buttons of the created task set are displayed in a list based on the set map. Favorite attributes can be attached to the task set. Only favorite task sets can be displayed by using a filter. When the task set button is pressed, the task set is played and the actual operation can be checked.

Figure 30:
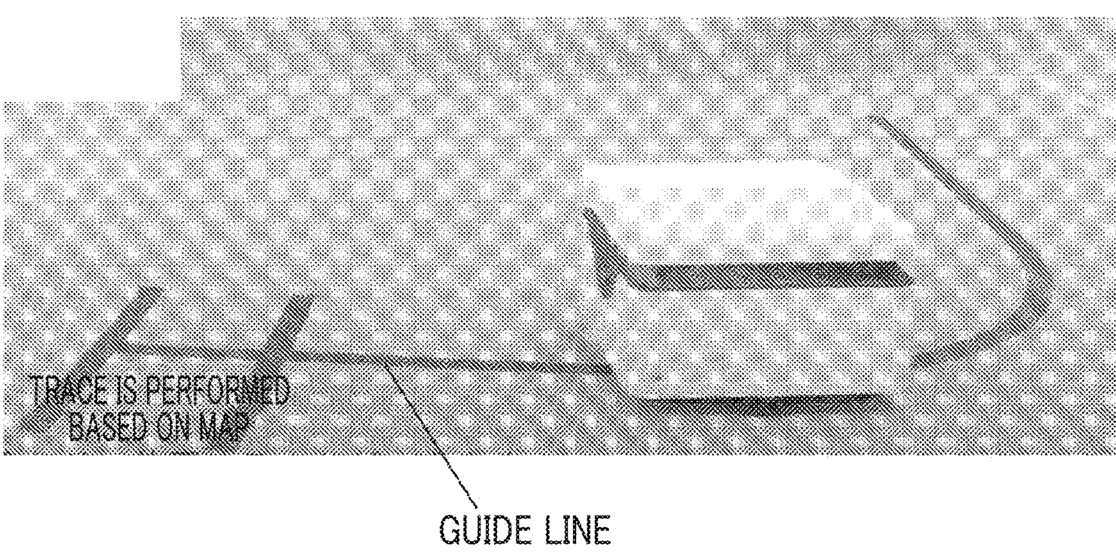
FIG. 30 is an explanatory diagram of a line trace.
Figure 31:
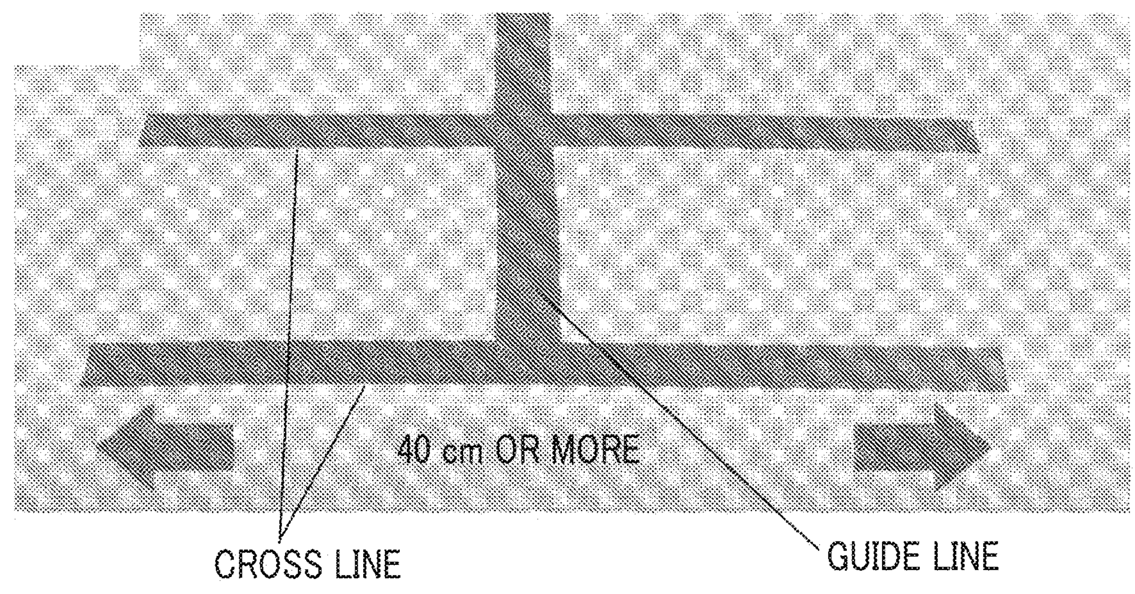
FIG. 31 is an explanatory diagram of a cross line.

Refer to FIGS. 30 and 31. The tasks that can be set in the task set include a line trace. As a preliminary preparation, a special line tape for guide is pasted on the floor. A cross line is made to stop the line trace. Two cross lines are made to be perpendicular to the guide line. The cross line is 40 cm or more, and the two cross lines are 20 cm or more and 30 cm or less. When creating a task set, a guide line is designated as the point where a task is to be installed, and the above-described "work point" is selected. At the same time, the line trace is selected as the task and the cross line is selected as the stop condition. When the task set including the task created in this manner is played, the autonomous driving using the map can be performed until the designated work point is reached, and the line trace task can be performed after the work point is reached. When the line trace task is performed, it can travel along the guide line and stop at the cross line.

Figure 32:
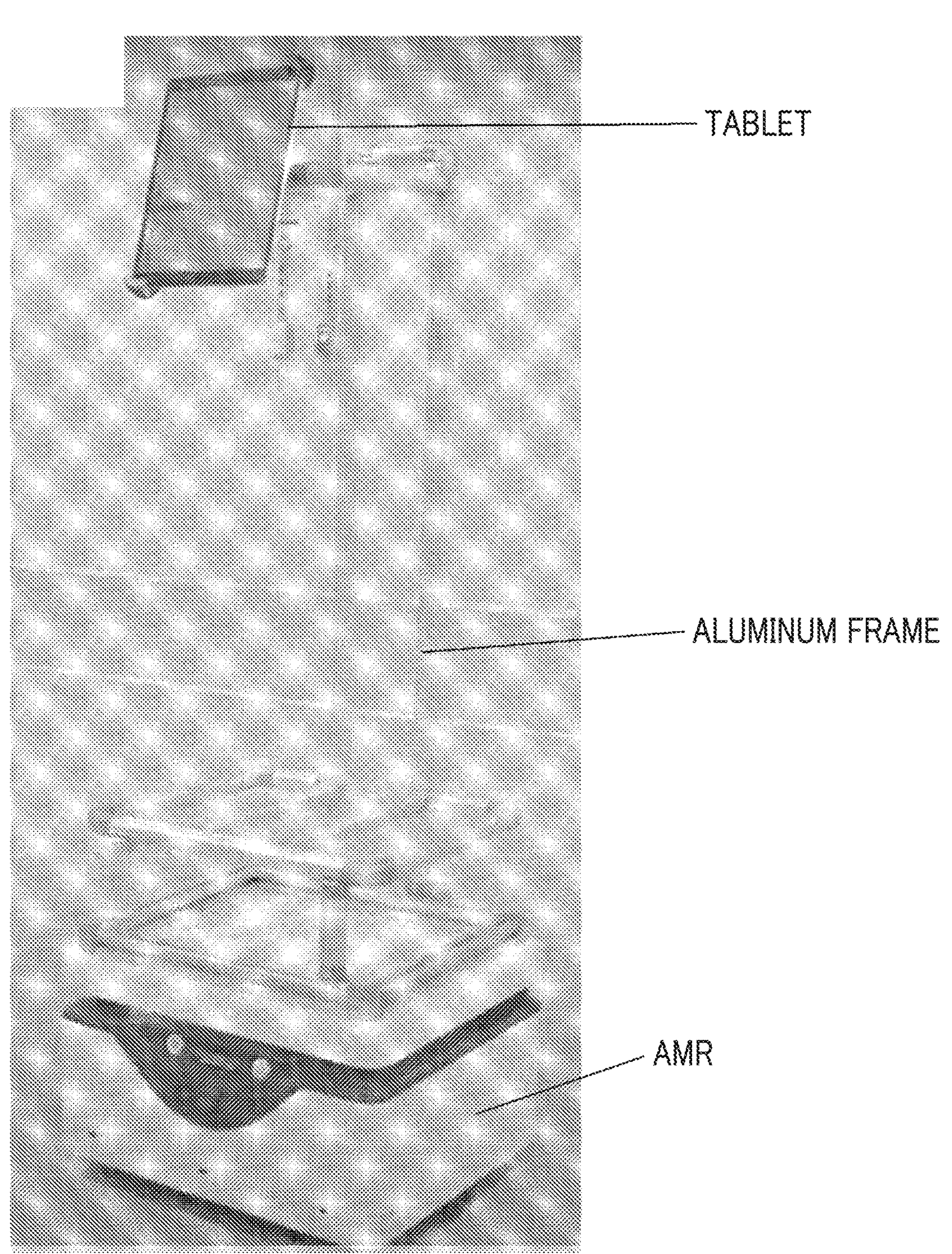
FIG. 32 is an explanatory diagram of a custom method of the AMR.
Figure 33:
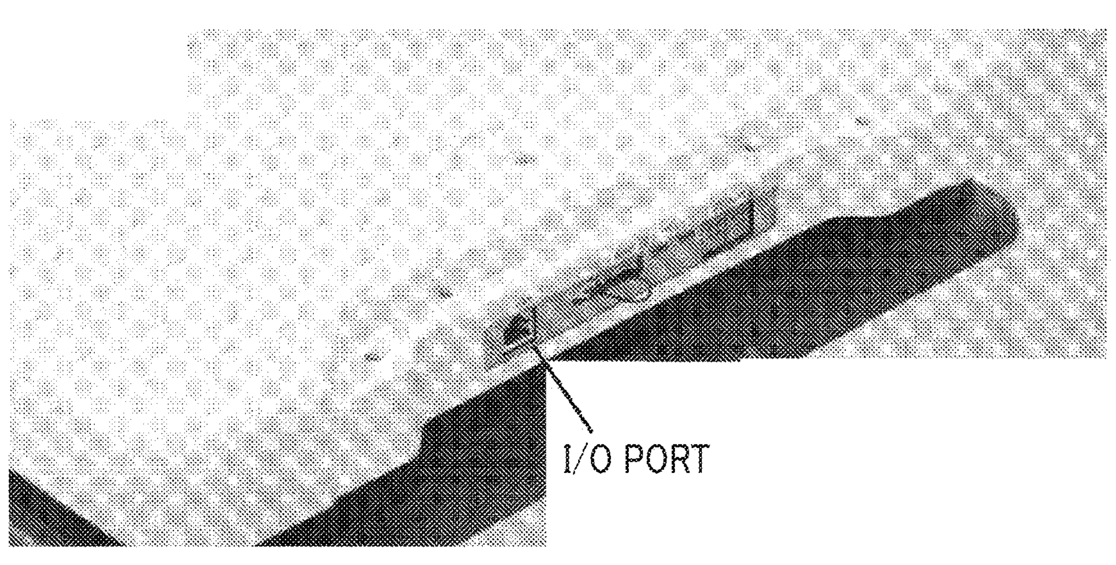
FIG. 33 is an explanatory diagram of an I/O port.

Refer to FIGS. 32 and 33. Next, a custom method of the AMR will be described. Here, a custom method for causing the AMR to function as a transport robot for picking equipped with a tablet will be described. First, a bolt (not shown) fastened to the mounting tapped hole of the top plate is removed. Next, the prepared frame is attached with bolts. The I/O port can be accessed by removing the cover member attached to the top plate. From left to right, the I/O ports are a LAN port, an emergency cutoff switch port, a GPIO port, a USB Type-C 5V constant output port and a relay output port, and a battery voltage constant output port and a relay output port. For example, by connecting a power cable of the tablet to a USB Type-C constant output port, power can be extracted from the AMR to the tablet.

Figure 34:
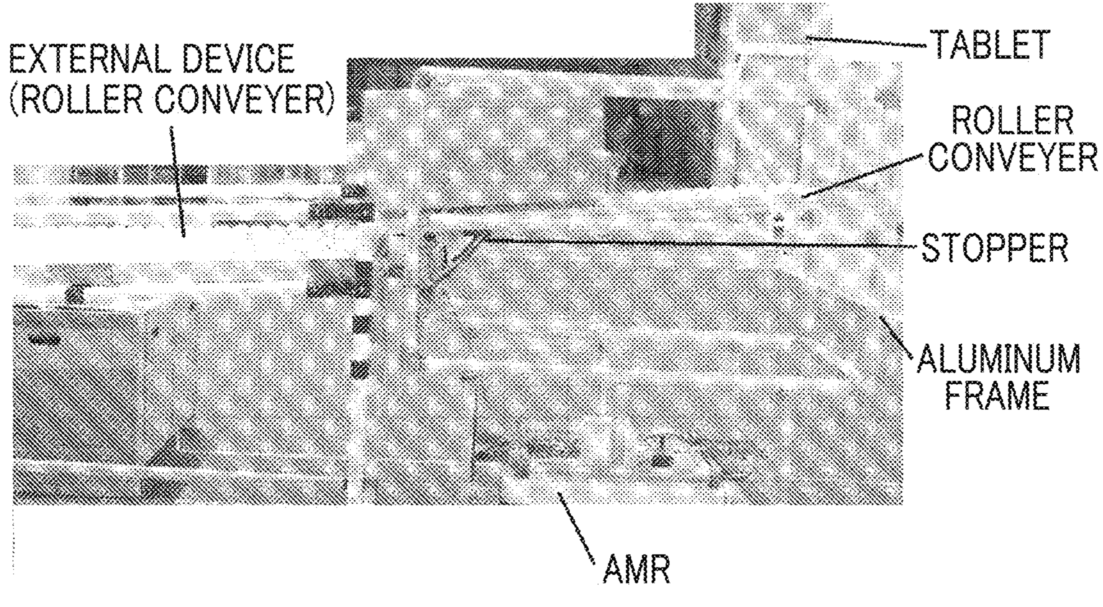
FIG. 34 is an explanatory diagram of another custom method of the AMR.

Refer to FIG. 34. Other custom examples of the AMR will be described. Here, an example in which a roller conveyor and an electric stopper are further attached to the aluminum frame of the above-described transport robot will be shown. The electric stopper is movable between a load restriction position that restricts the movement of the load on the roller conveyor in the transport direction and a restriction release position that allows the movement. When the load is loaded on the roller conveyor of the AMR, the electric stopper is positioned at the load restriction position. After the AMR moves to a position where the load can be delivered to another roller conveyor as an external device, the AMR moves the electric stopper from the load restriction position to the restriction release position (position shown in FIG. 34). Accordingly, the load on the roller conveyor is transported to the roller conveyor of the external device. The movement up to this point can be implemented by creating the task set described above.

Autonomous Mobile Robot that can be Used Quickly and Easily

It is possible to start the setup quickly using the application from the smartphone or tablet on hand. The map and task can also be intuitively set using the application, so it is possible to quickly respond to changes in layout and work content.

Automatically Avoiding Obstacles

The AMR adopts SLAM technology to perform high-speed map creation and self-positioning. It is equipped with a LiDAR (laser scanner) and a plurality of obstacle sensors, and can carry a load while automatically avoiding people and obstacles.

Compatible with Line Trace

Not only guideless driving in which a map is created and autonomous movement is performed, but also highly accurate traveling by line trace (following a line on the floor surface) by a camera is possible. Since an inexpensive line tape is used, the initial investment at the site can be suppressed as compared with the case of a general magnetic tape.

Sophisticated Design

The AMR is a collaborative robot that can be used quickly and easily and works with people. Although the AMR is for industrial use, the AMR has a user-friendly and beautiful design.

Creating Custom Robot

AMR is expected to be equipped with various devices. An aluminum frame or the like can be easily attached to a plurality of mounting tapped holes on the top plate. A 24V (battery voltage)/5V power outlet, a shutdown switch, a GPIO, a LAN port, and Wifi (registered trademark) can also be used. Scale-up such as group control by a plurality of AMRs is also possible. The AMR can contribute to automation in various places such as factories, logistics, and restaurants.

The present invention has been described above based on the embodiments. The embodiment is an example, and it is understood by those skilled in the art that various modification examples are possible for each of the components and combinations of the respective processing processes of the embodiment, and that such modification examples are also within the scope of the present invention. Hereinafter, such modification examples will be described.

Modification Example 1

In the embodiment, all the functions of the operation setting App are executed by one terminal (operation setting device 200), but the present invention is not limited thereto, and a part of the functions of the operation setting App, for example, the control device 100 of the AMR may have the function of each of the screen display control units 210, 214, and 218. In this case, each of the screen display control units 210, 214, and 218 transmits various screens to the operation setting device 200 and causes the display unit 208 to display the various screens. For example, each screen display control unit 210, 214, or 218 may transmit various screens to the operation setting device 200 as web pages displayed by a web browser.

Modification Example 2

Figure 35:
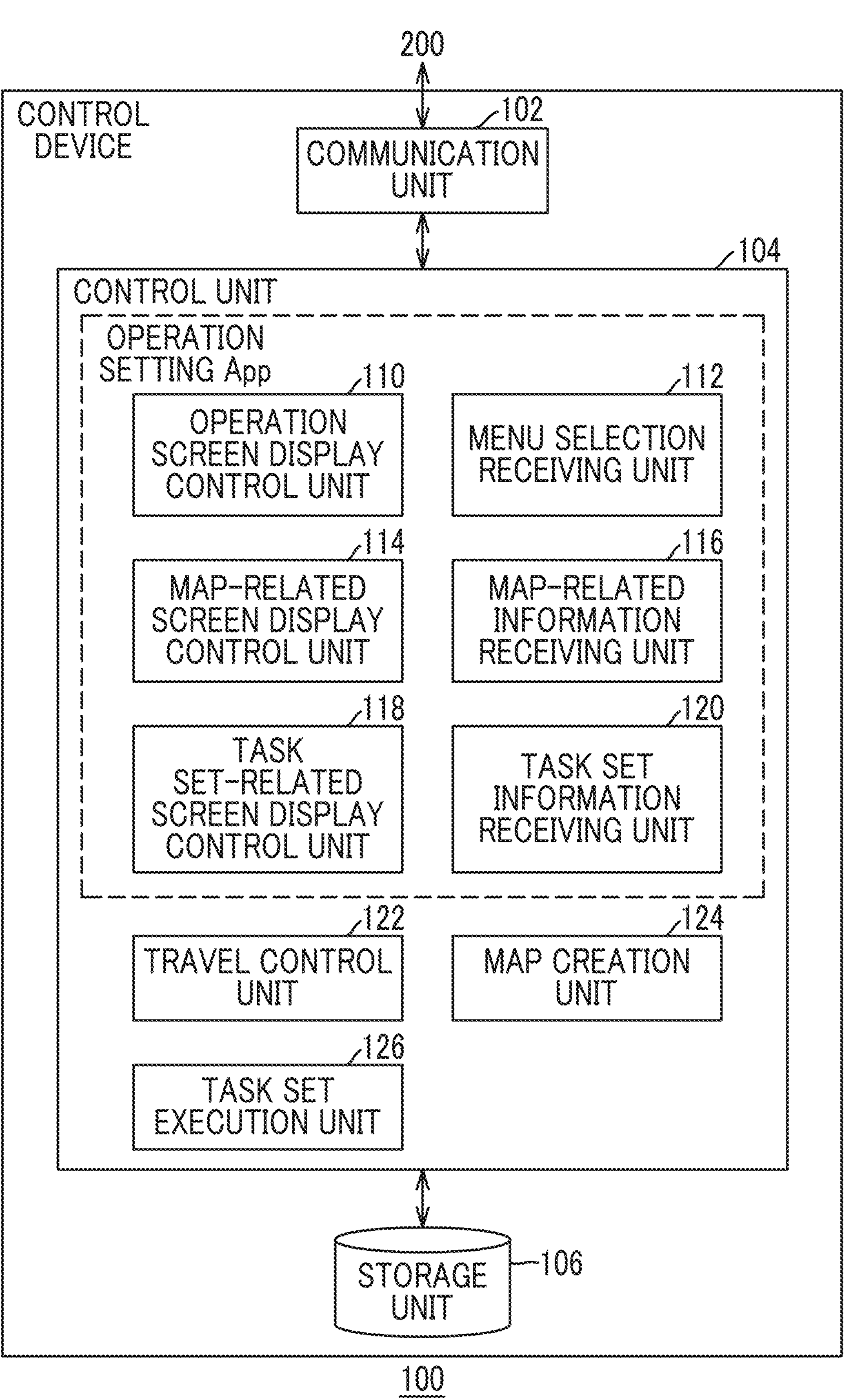
FIG. 35 is a block diagram showing a functional configuration of a modification example of a control device of the AMR.

Unlike the embodiment, various screens may be displayed on the display unit of the control device 100 to set the operation of the AMR. In this case, the control device 100 of the AMR also functions as an operation setting device. Refer to FIG. 35. The control unit 104 of the control device 100 of the present modification example includes an operation screen display control unit 110, a menu selection receiving unit 112, a map-related screen display control unit 114, a map-related information receiving unit 116, a task set-related screen display control unit 118, a task set information receiving unit 120, a travel control unit 122, a map creation unit 124, and a task set execution unit 126.

The operation screen display control unit 110, the menu selection receiving unit 112, the map-related screen display control unit 114, the map-related information receiving unit 116, the task set-related screen display control unit 118, and the task set information receiving unit 120 respectively correspond to the operation screen display control unit 210, the menu selection receiving unit 212, the map-related screen display control unit 214, the map-related information receiving unit 216, the task set-related screen display control unit 218, and the task set information receiving unit 220. In this case, each of the display control units 110, 114, and 118 causes various screens to be displayed on a predetermined display unit of the AMR, and each of the receiving units 112, 116, and 120 receives inputs on various screens displayed on the display unit. For example, the display 32 of the AMR may be configured as a touch panel display, each of the display control units 110, 114, 118 may cause the display 32 to display various screens, and each of the receiving units 112, 116, 120 may receive inputs by the user on the various screens via the display 32.

In addition, the present invention can be regarded not only as an invention of an operation setting device, but also as an invention of a program that causes the operation setting device to implement (execute) each function of the operation setting App, can be regarded as an invention of a storage medium (a storage medium such as a DVD or a USB memory, a hard disk, or the like) in which the (operation setting) program is stored, or can be regarded as an invention of an operation setting method having each step executed by the (operation setting) program. In addition, the present invention can be regarded as an invention of a system including an operation setting device and one or a plurality of autonomous bogies that operate based on a setting in the operation setting device. Further, the operation setting device may be configured by a single device or may be configured by a plurality of devices. Similarly, the operation setting program and the operation setting method may be executed by a single device or may be distributed to a plurality of devices.

In addition, it is also possible to consider an operation setting device, an operation setting program, and an operation setting method that do not have a task set setting function by the user and can execute the wall-following map creation mode, as an invention capable of improving usability regarding operation setting of an autonomous bogie.

The present disclosure can be used for an autonomous bogie.

It should be understood that the invention is not limited to the above-described embodiment, but may be modified into various forms on the basis of the spirit of the invention. Additionally, the modifications are included in the scope of the invention.

What is claimed is:

1. An operation setting device of an autonomous bogie, comprising:

a storage device storing an operation setting program; and at least one processor configured to execute the operation setting program to cause the at least one processor to:

receive a designation of a specific location on a map of a traveling area of the autonomous bogie from a user;

receive a selection that designates an operation of the autonomous bogie at the specific location as either a passing point, which is a point through which the autonomous bogie is passed, or a work point, which is a point at which the autonomous bogie is stopped, from the user;

when the work point is designated, receive a selection of predetermined work to be performed after the autonomous bogie is stopped, the predetermined work being selectable from a plurality of predefined pieces of work from the user; and control a motor of the autonomous bogie to cause the autonomous bogie to travel to the specific location, such that the autonomous bogie is passed through the specific location when designated as the passing point, or is stopped at the specific location when designated as the work point, wherein the plurality of predefined pieces of work includes at least causing the autonomous bogie to wait at the work point for a designated waiting time.

2. The operation setting device of an autonomous bogie according to claim 1, wherein the at least one processor is further configured to:

when receiving the designation of the specific location while the user operates a predetermined operation icon to cause the autonomous bogie to travel, designate a location where the autonomous bogie is present at that time as the specific location.

3. The operation setting device of an autonomous bogie according to claim 1, wherein the at least one processor is further configured to:

execute a wall-following map creation mode in which the map of the traveling area is created by detecting surroundings by a surrounding detection sensor of the autonomous bogie while the autonomous bogie is caused to travel along a wall.

4. The operation setting device of an autonomous bogie according to claim 3, wherein the at least one processor is further configured to:

receive, as the wall-following map creation mode, a selection of either a left wall-following mode in which the autonomous bogie is caused to travel along a wall on a left side in a traveling direction of the autonomous bogie or a right wall-following mode in which the autonomous bogie is caused to travel along a wall on a right side in the traveling direction of the autonomous bogie.

5. The operation setting device of an autonomous bogie according to claim 3, wherein the at least one processor is further configured to:

execute a manual map creation mode in which the map of the traveling area is created by detecting surroundings by the surrounding detection sensor of the autonomous bogie while the autonomous bogie is caused to travel according to a traveling operation on a predetermined operation unit by the user.

6. The operation setting device of an autonomous bogie according to claim 1, wherein the at least one processor is further configured to:

display a traveling route of the autonomous bogie, and a screen displaying the designated specific location and whether the specific location is a passing point or a work point to be identified, on the map of the traveling area of the autonomous bogie.

7. A non-transitory computer readable medium storing an operation setting program, the operation setting program when executed by at least one processor of an operation setting device of an autonomous bogie, causing the at least one processor to:

receive a designation of a specific location on a map of a traveling area of the autonomous bogie from a user;

receive a selection that designates an operation of the autonomous bogie at the specific location as either a passing point, which is a point through which the autonomous bogie is passed, or a work point, which is a point at which the autonomous bogie is stopped, from the user;

when the work point is designated, receive a selection of predetermined work to be performed at the work point, the predetermined work being selectable from a plurality of predefined pieces of work from the user; and control a motor of the autonomous bogie to cause the autonomous bogie to travel to the specific location, such that the autonomous bogie is passed through the specific location when designated as the passing point, or is stopped at the specific location when designated as the work point, wherein the plurality of predefined pieces of work includes at least causing the autonomous bogie to wait at the work point for a designated waiting time.

8. An operation setting method of an autonomous bogie, comprising:

a step of receiving a designation of a specific location within a traveling area of the autonomous bogie from a user;

a step of receiving a selection that designates an operation of the autonomous bogie at the designated specific location as either a passing point, which is a point through which the autonomous bogie is passed, or a work point, which is a point at which the autonomous bogie is stopped, from the user;

a step of receiving, when the work point is designated, a selection of predetermined work to be performed at the work point, the predetermined work being selectable from a plurality of predefined pieces of work from the user; and a step of controlling a motor of the autonomous bogie to cause the autonomous bogie to travel to the specific location, such that the autonomous bogie is passed through the specific location when designated as the passing point, or is stopped at the specific location when designated as the work point, wherein the plurality of predefined pieces of work includes at least causing the autonomous bogie to wait at the work point for a designated waiting time.

* * * * *